United States Patent [19]

Hamada et al.

[11] Patent Number: 5,005,039
[45] Date of Patent: Apr. 2, 1991

[54] AUTOFOCUSING CAMERA

[75] Inventors: Masataka Hamada; Tokuji Ishida; Kenji Ishibashi, all of Osaka, Japan

[73] Assignee: Minolta Camera Kabushiki Kaisha, Osaka, Japan

[21] Appl. No.: 352,190

[22] Filed: May 16, 1989

[30] Foreign Application Priority Data

May 17, 1988 [JP] Japan .................................. 63-119690

[51] Int. Cl.⁵ .............................................. G03B 13/00
[52] U.S. Cl. ...................................... 354/402; 354/412
[58] Field of Search ................ 354/400–409, 354/412

[56] References Cited

U.S. PATENT DOCUMENTS

| 4,286,849 | 9/1981 | Uchidoi et al. | 354/412 |
| 4,816,856 | 3/1989 | Hamada et al. | 354/402 |
| 4,853,733 | 8/1989 | Watanabe et al. | 354/412 |
| 4,855,779 | 8/1989 | Ishikawa et al. | 354/412 |
| 4,860,045 | 8/1989 | Hanada et al. | 354/402 |

Primary Examiner—L. T. Hix
Assistant Examiner—David M. Gray
Attorney, Agent, or Firm—Burns, Doane, Swecker & Mathis

[57] ABSTRACT

An autofocusing camera comprises a focus detecting circuit for repeatedly detecting a foucsing state of an objective lens with respect to a photographic object and outputting a focus adjustment signal, and an object detecting circuit for detecting movement of the object in accordance with a plurality of the focus adjustment signals. The lens is driven during a shutter release operation when the object detecting circuit detects movement of the photographic object. The lens drive is prohibited when the object is moving away from the camera.

12 Claims, 23 Drawing Sheets

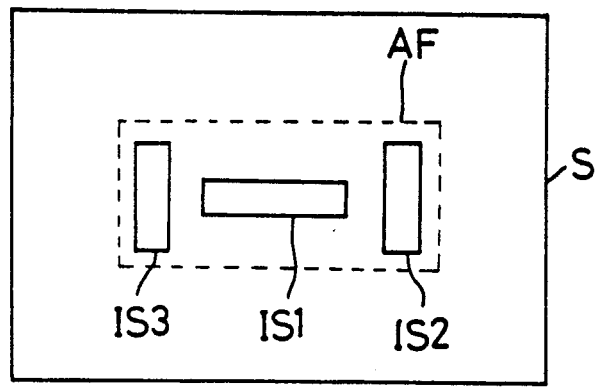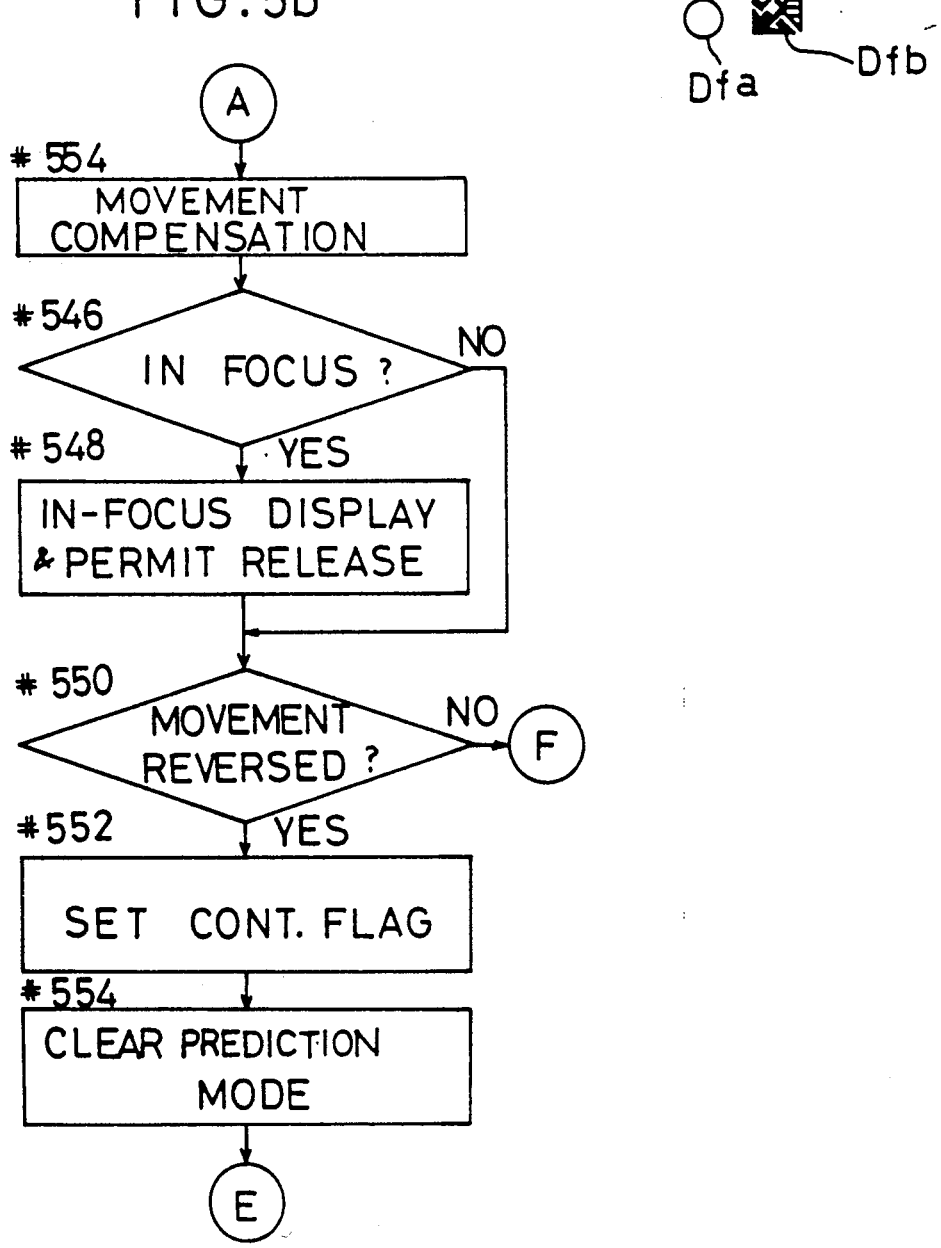

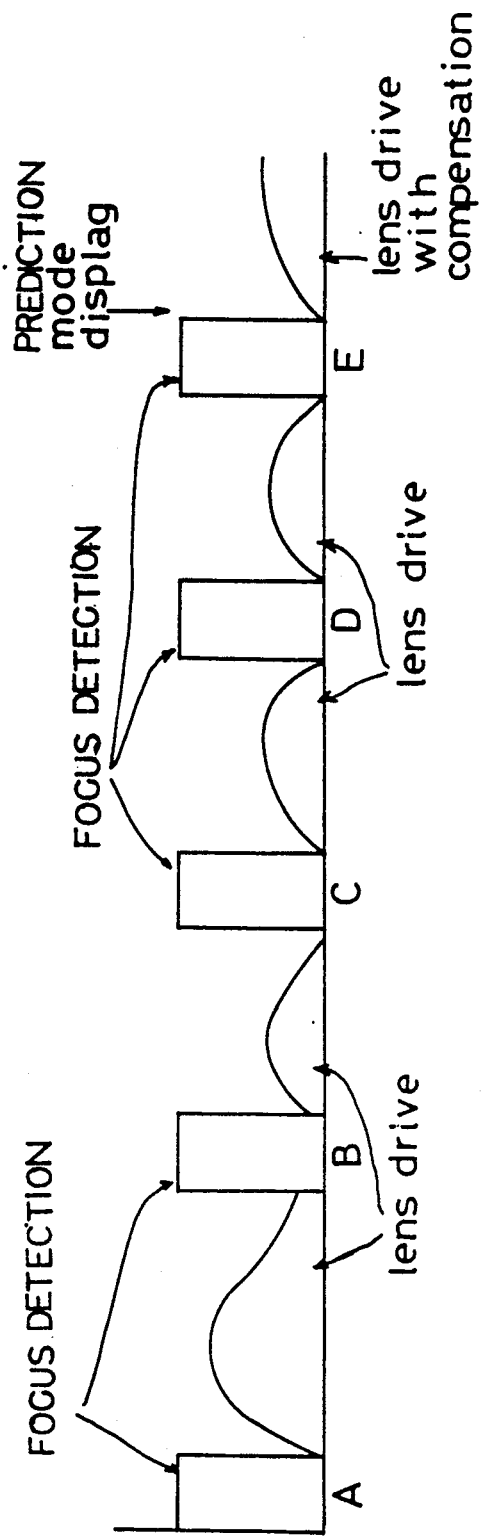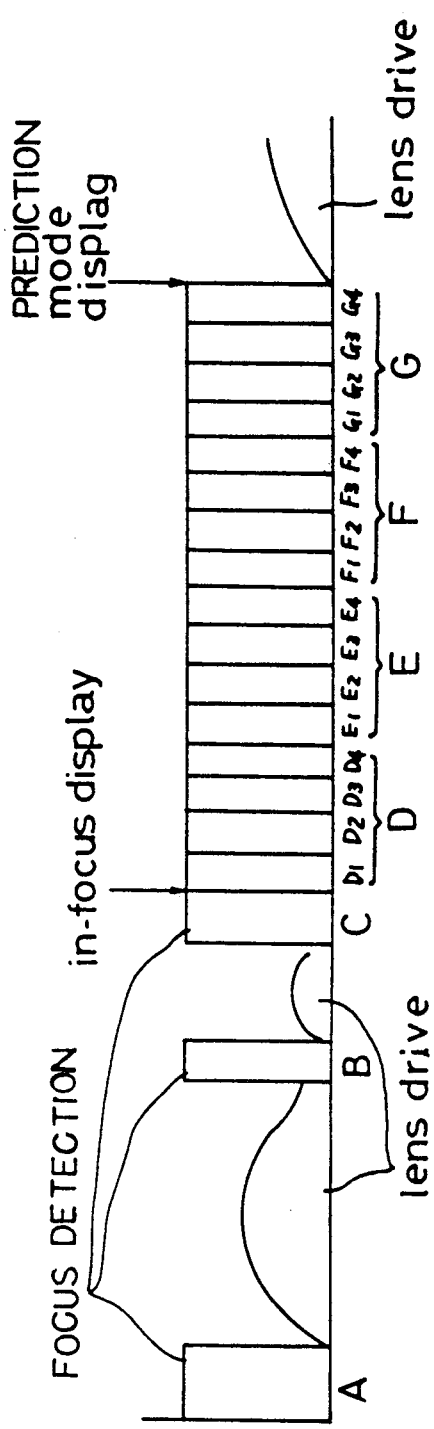

AUTOFOCUSING CAMERA

BACKGROUND OF THE INVENTION

The present invention relates to a single lens reflex camera having an autofocusing function.

More particularly, the invention relates to a camera comprising a mirror control device for moving mirrors into and out of an image-forming optical path extending from an objective lens to a film, the mirrors acting to reflect a bundle of rays transmitted from a photographic object to a finder optical system; a focus detecting device for calculating a deviation of the objective lens from an in-focus position with respect to the object; a lens drive device operable in response to the deviation detected by the focus detecting device for moving the lens to the in-focus position; and a focusing mode switching device for switching between a moving object focusing mode for permitting the lens drive device to move the lens while the mirrors are retracted from the image-forming optical path, and a stationary object focusing mode for prohibiting the lens movement during the mirror retraction. In the moving object focusing mode, the in-focus position at a photographing time is predicted and the lens movement to the predicted in-focus position is permitted concurrently with retraction of the mirrors from the image-forming optical path, thereby reducing the time taken from the start of an autofocusing operation till exposure onto the film. Hereinafter the moving object focusing mode is called a prediction focusing mode. In this mode, the focusing operation is capable of following a moving object effectively. In the stationary object focusing mode, the lens movement is prohibited during the mirror retraction, thus fixing the lens position once it has reached a focusing range adjacent an in-focus position with respect to the object. Hereinafter the stationary object focusing mode is called a one-shot focusing mode. This mode effectively prevents the lens from inadvertently deviating from the in-focus condition. Further, this construction allows the photographer to carry out what is known as focus lock photography in which a desired composition is selected by positioning the object in a photographic range different from the range corresponding to a focus detecting region after the in-focus condition is attained.

In a known camera as noted above, a control device is provided specially for switching between the prediction focusing mode and the one-shot focusing mode. The photographer manually operates this control device in accordance with his or her judgment as to photographic conditions.

With the known camera, however, since the mode switching is manually effected, the photographer could forget to carry out the switching operation or mishandle the operation, thereby establishing a wrong focusing mode. Consequently, the one-shot focusing mode may be in operation when photographing a moving object. Then the photograph is likely to be blurred since the autofocusing operation lacks reliable follow-up. Conversely, the prediction focusing mode may be selected when photographing a stationary object. When the above-mentioned focus lock photography is carried out in this state, a change in the composition will result in the focusing operation being effected with respect to an unintended object lying in the photographic range corresponding the focus detecting range after the change in the composition. The photograph thus taken will be completely out of focus.

SUMMARY OF THE INVENTION

In light of the state of the art noted above, an object of the present invention is to provide a camera which assures a reliable autofocusing operation based on conditions of a photographic object and intentions of the photographer.

The above object is fulfilled, according to a first aspect of the present invention, by a camera comprising focus detecting means for repeatedly detecting a focusing state of an objective lens with respect to a photographic object and outputting a focus adjustment signal; object detecting means for detecting movement of the object to be photographed in accordance with a plurality of the focus adjustment signals; image magnification detecting means for detecting an image magnification rate; a manually operable member; release means for starting a shutter release operation in response to a manual operation to the operable member and carrying out a subsequent photographic operation; lens drive means capable of driving the objective lens during the shutter release operation when the object detecting means detects movement of the object; and prohibiting means for prohibiting the lens drive means from driving the objective lens when the image magnification is greater than a predetermined rate.

In the foregoing construction, the prohibiting means prohibits the lens movement in a prediction focusing mode when the magnification is at a high rate, in order to establish a one-shot focusing mode. In other words, the prohibiting means prohibits the moving object focusing mode in order to avoid an inadvertent focusing operation due to shaking of the camera at a photographing time.

According to a second aspect of the invention, the prediction focusing mode is employed at an initial stage in which a deviation of the lens has not been calculated by the focus detecting means. This mode is taken because the nature of the object is unknown at this stage, which assures a focusing operation with an excellent follow-up ability even if the object is moving.

Switching is made to the one-shot focusing mode after an in-focus condition is detected for a predetermined period, when the object is abruptly moved to exceed a defocus amount detected by the focus detecting means over a predetermined value. This switching is made in order to maintain the in-focus condition with respect to the object for which the focus detection has been effected, based on the judgment that the defocus is not due to movement of the object but is due to a recomposition made by the photographer to change the composition by setting a stationary object in a varied photographic range.

According to a third aspect of the invention, the camera further comprises metering means for measuring brightness of the photographic object. The one-shot focusing mode is employed when the metering means provides a measurement below a predetermined level, which indicates that the photographic object is dark. This measurement is taken in order to avoid an inadvertent focusing operation since the focus detecting means cannot provide a highly reliable detection result at this time.

As described above, the camera according to the present invention judges conditions of a photographic object and intentions of the photographer from results of detection by the focus detecting means, for automatically effecting focus adjustments accordingly. This feature assures desired photographs taken in perfect focus with no possibility of the focusing operation being forgotten or mishandled.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 3 is a schematic illustration of a field view in a finder, FIGS. 5a through 5c are a flow chart of an autofocusing subroutine, FIGS. 6a and 6b are timing charts illustrating sequences of focus detecting operations.

DETAILED DESCRIPTION OF THE PREFERRED EMBODIMENT

An embodiment of the present invention will be described hereinafter with reference to the drawings.

Figure 1:
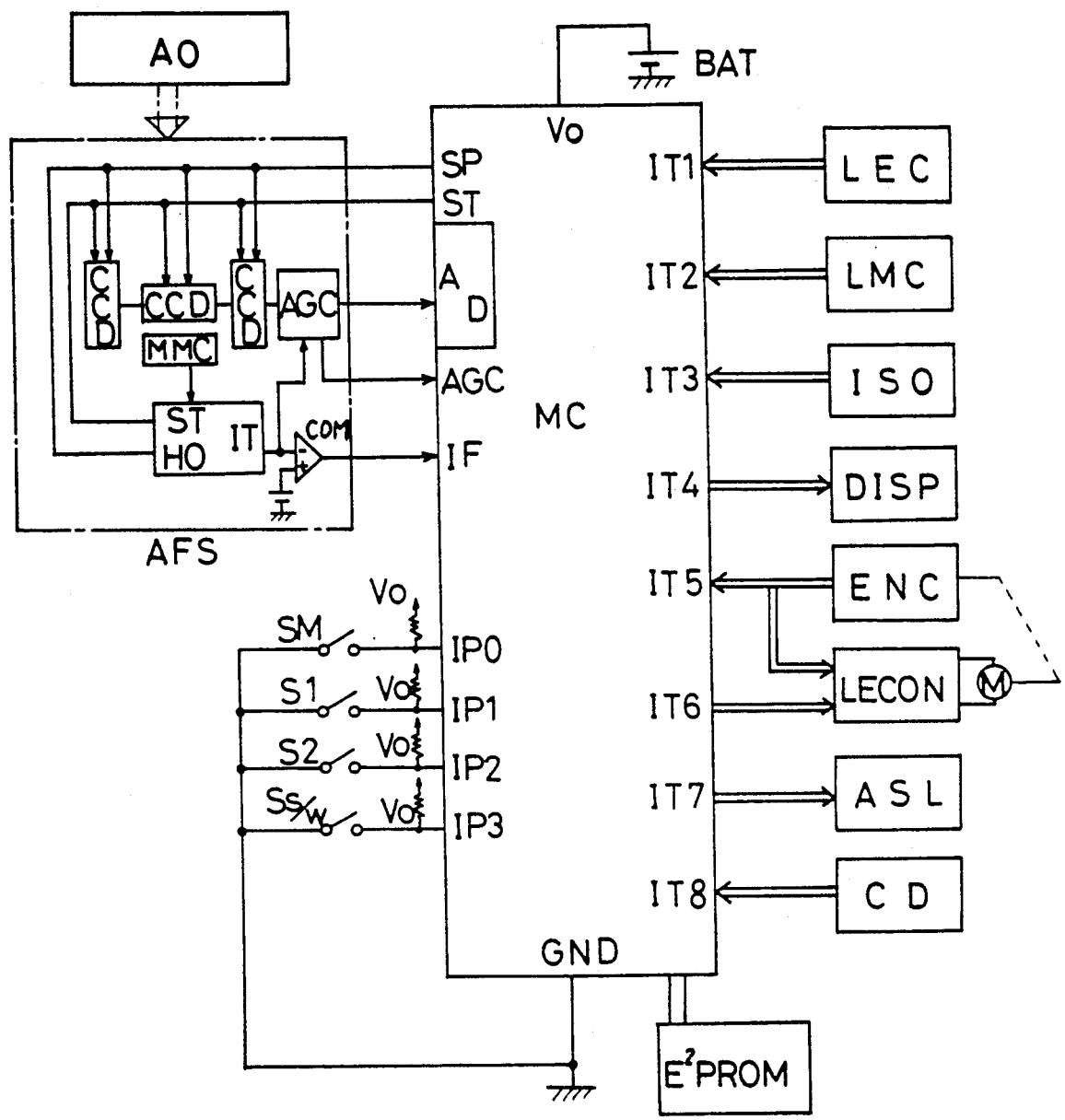
FIG. 1 is a block diagram of a camera control circuitry according to the present invention.

FIG. 1 is a block diagram of an entire camera circuitry.

Reference MC denotes a microcomputer for carrying out an overall sequence control of the camera and arithmetic calculations for exposure and focus detecting controls. Reference LEC denotes a lens circuit of an objective lens removably attached to a camera body (not shown). The lens circuit LEC communicates to the camera body lens information peculiar to the lens such as a fully open diaphragm aperture value and focal length.

Reference AFS denotes a focus detecting circuit for receiving information from a focus detecting optical system AO concerning an image formed by light having passed through the objective lens, and converting this information into an analog signal. The focus detecting circuit AFS includes a light receiving circuit CCD having a CCD type light receiver array, a monitoring light receiving element MMC used for controlling an integrating time of the light receiving circuit CCD, an integrating circuit IT for integrating the current received from the monitoring light receiving element MMC, a comparator COM for comparing the output of the integrating circuit IT with a predetermined value, and an amplifier circuit AGC for amplifying the analog signal from the light receiving circuit CCD in accordance with the output of the integrating circuit IT.

How this focus detecting circuit AFS operates will be described briefly. When the microcomputer MC outputs an integration start signal ST, the light receiving circuit CCD and integrating circuit IT are reset and start an integrating operation. The microcomputer MC outputs an integration stop signal SP when the integration output of the integrating circuit IT reaches the predetermined value to reverse the output of the comparator COM or when an integration timer in the microcomputer MC reaches a predetermined count. As a result, the integration output in the light receiving circuit CCD is sent to a transfer register (not shown) to be transferred through the amplifier circuit AGC to the microcomputer MC.

The microcomputer MC calculates a deviation of the objective lens from an in-focus position with respect to a photographic object by using the output of the focus detecting circuit AFS. Thus, the focus detecting optical system AO, focus detecting circuit AFS and microcomputer MC constitute focus detecting means.

The integrating circuit IT holds the integration output in response to the integration stop signal SP. In accordance with this output, the amplifier circuit AGC amplifies the analog signal from the light receiving circuit CCD eighthold at maximum for output to the microcomputer MC. The microcomputer MC contains a digital converter A/D for converting the analog signal into digital data. The amplifier circuit AGC also outputs gain data to the microcomputer MC.

Reference LMC denotes a metering circuit for detecting a luminance level of the photographic object by metering the light having passed the objective lens. The metering circuit LMC outputs to the microcomputer MC an APEX-type digital signal Bvo corresponding to the luminance level of the photographic object. Reference ISO denotes a film sensitivity reading circuit for outputting to the microcomputer MC an APEX-type digital signal Sv corresponding to film sensitivity. Reference DISP denotes a display circuit for displaying a focusing state of the objective lens and other information.

Reference ENC denotes an encoder for detecting rotation of an autofocusing motor M and outputting a pulse signal each time the autofocusing motor M rotates a unit angle to a lens control circuit LECON to be described later. The lens control circuit LECON drives the autofocusing motor M in response to motor control signals received from the microcomputer MC, the motor control signals prescribing a number of rotation, a speed and a rotating direction of the motor M. Further, the lens control circuit LECON detects on the basis of the pulse signals received from the encoder ENC whether the autofocusing motor M has rotated a prescribed amount or not, to stop the motor M. The microcomputer MC includes a counter for determining a lens position, which is incremented or decremented in response to the pulse signal input from the encoder ENC.

Thus, the microcomputer MC, lens control circuit LECON, and autofocusing motor M constitute focus adjusting means, operable in response to the deviation detected by the focus detecting means, for moving the objective lens to an in-focus position with respect to a photographic object.

Reference ASL denotes an auxiliary light circuit for emitting auxiliary light toward a photographic object when focus detection is impossible and ambient light is dark. Reference CD denotes a card circuit which selectively loads an IC card (not shown) and transmits external switching information from a memory in the card to the microcomputer MC. Such switching information, for example, provides a state for allowing only one-shot AF, a state for allowing only spot AF (which is a focus detection using a small area), and a state for prohibiting auxiliary light AF (which is a focus detection carried out by emitting the auxiliary light). Reference BAT denotes a source battery for supplying power to all the circuits.

Reference SM denotes a main switch opened and closed by operating a main switch member (not shown). Reference S1 denotes a metering switch closable by a first-step depression of a shutter release button (not shown). The closure of the metering switch S1 initiates the metering operation and the autofocusing operation. Reference S2 denotes a release switch closable by a second-step depression of the shutter release button. The closure of the release switch S2 effects a photo-taking operation. Reference Ss/w denotes an AF area changeover switch for selecting between the spot AF (which is a focus detecting state using a small center area of three focus detecting areas as described later) and wide AF (which uses the three focus detecting areas).

Reference EEPROM denotes a memory mounted inside or outside the microcomputer MC. This memory EEPROM is electrically erasable and capable of storing information without power supply. The memory EEPROM may store camera adjustment data, camera mode switching data and so on. Thus the specification of the camera may readily be set to the level and needs of a photographer.

Figure 2:
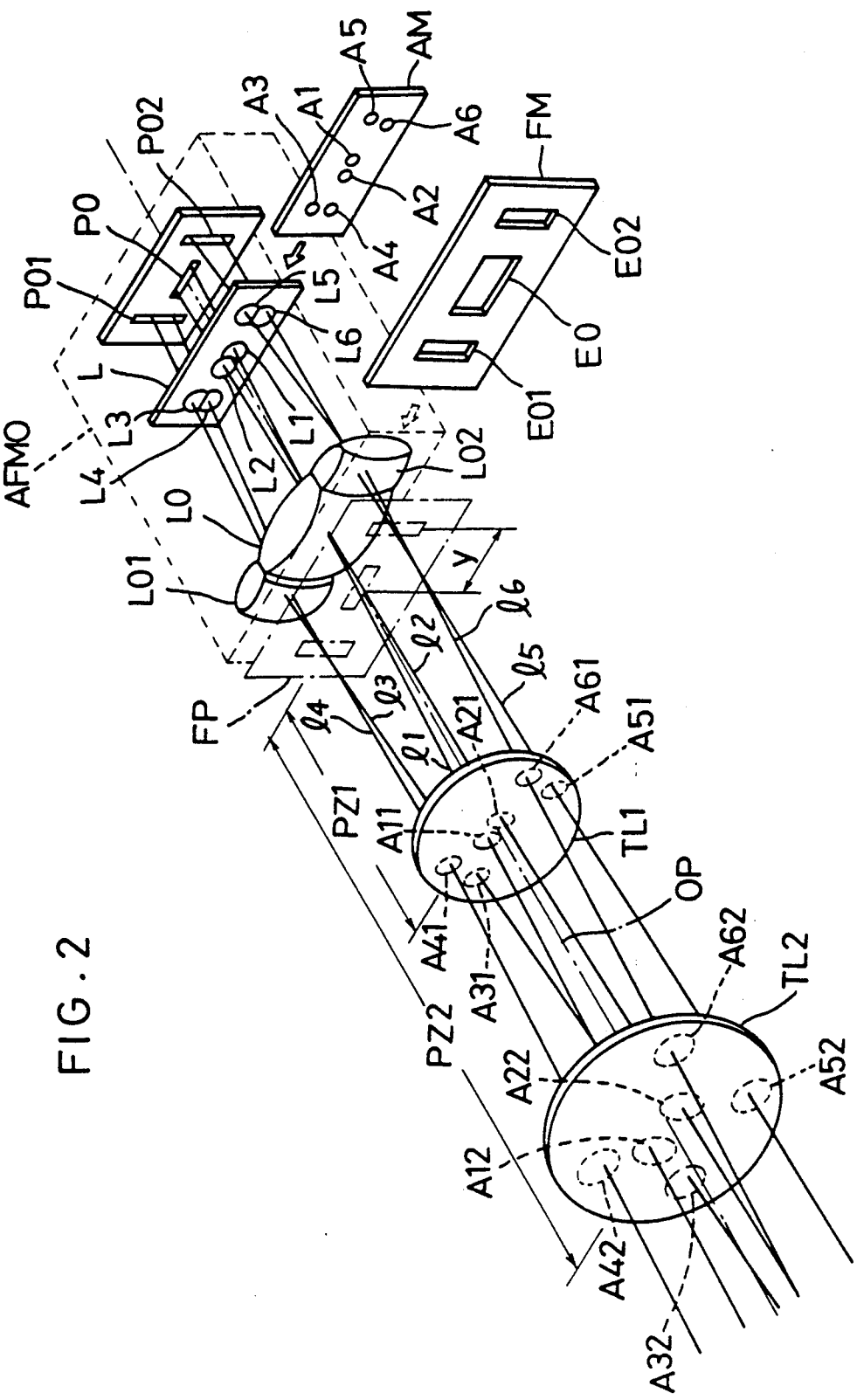
FIG. 2 is a schematic perspective view of a focus detecting optical system.

Next, reference is made to FIG. 2 which is an exploded perspective view of a construction surrounding the focus detecting optical system AO.

References TL1 and TL2 denote lens components of the objective lens, which are located at distances PZ1 and PZ2 (PZ1 being less than PZ2) from a plane equivalent to an intended image-forming plane or film plane FP, respectively (these distances being hereinafter referred to as the pupil distances). A field mask FM is disposed adjacent the intended image-forming plane FP. The field mask FM defines a sideways elongated, first rectangular opening EO centrally thereof, and a second and a third rectangular openings EO1 and EO2 which are vertically elongated and disposed at opposite sides. Light beams traveling from photographic objects through the rectangular openings EO, EO1 and EO2 of the field mask FM pass through condenser lenses LO, LO1 and LO2 to be condensed, respectively. These condenser lenses LO, LO1 and LO2 are hereinafter referred to as the first to third condenser lenses LO, LO1 and LO2 corresponding to the rectangular openings EO, EO1 and EO2 of the field mask FM.

Rearwardly of the condenser lenses LO, LO1 and LO2 are an aperture mask AM and a re-imaging lens plate L. The re-imaging lens plate L includes a sideways arranged re-imaging lens pair L1 and L2 centrally thereof, and vertically arranged re-imaging lens pairs L3-L6 at opposite sides. These lenses L1-L6 comprise convex lenses having the same radius of curvature, and each defining one flat surface. The central re-imaging lens pair L1 and L2 is hereinafter referred to as the first re-imaging lens pair L1 and L2, the lateral re-imaging lens pair L3-L4 as the second re-imaging lens pair L3 and L4, and the lateral re-imaging lens pair L5 and L6 as the third re-imaging lens pair L5 and L6 corresponding to the rectangular openings EO, EO1 and EO2 of the field mask FM.

The aperture mask AM defines field stops A1-A6 at positions opposed to the re-imaing lenses L1-L6. This aperture mask AM is disposed immediately forwardly of the re-imaging lens plate L and in tight contact with the flat surface of the re-imaging lens plate L.

Rearwardly of the re-imaging lens plate L is a circuit board P including three CCD line sensors PO, PO1 and PO2. The line sensor PO at the center is sideways elongated, while the line sensors PO1 and PO2 disposed laterally are vertically elongated. Thus these CCD line sensors PO, PO1 and PO2 extend in a way to correspond to the directions in which the re-imaging lens pairs L1-L6 are arranged on the re-imaging lens plate L, respectively. Each of the CCD line sensors PO, PO1 and PO2 includes two, a first and a second, arrays of light-receiving elements for separately effecting photoelectric conversion on two images of a photographic object re-formed by each re-imaging lens pair on each CCD line sensor. The CCD line sensors PO, PO1 and PO2 are hereinafter referred to as the first to third CCD line sensors PO, PO1 and PO2 corresponding to the rectangular openings EO, EO1 and EO2 of the field mask FM.

The components in a block AFMO bounded by dotted lines in FIG. 2 are integrated into an AF (autofocus) sensor module. The field mask FM, condenser lenses LO, LO1 and LO2, aperture mask AM and re-imaging lens plate L constitute the focus detecting optical system AO.

The focus detecting optical system AO as constructed above provides the images of photographic objects for use by a focus detecting system X, and the latter detects focusing positions as follows.

A focus detecting light beam including main rays of light l3 and l4 and traveling from a photographic object in a region off the optical axis Op of the objective lens reaches the field mask FM in a manner to deviate from the optical axis Op at a certain angle thereto. This off-axial light beam passes through the second rectangular opening EO1 of the field mask FM and impinges upon the second condenser lens LO1. The second condenser lens LO1 condenses the off-axial light beam and refracts it toward the optical axis Op. Thereafter the off-axial light beam travels through the second field stops A3 and A4 of the aperture mask AM to the second re-imaging lens pair L3 and L4 of the re-imaging lens plate L. The focus detecting, off-axial light beam incident on the second re-imaging lens pair L3 and L4 is then condensed onto the second CCD line sensor PO1 and re-forms a vertical pair of images on the second CCD line sensor PO1 for use in the focus detection.

Similarly, a focus detecting, off-axial light beam including main rays of light l5 and l6 reaches the field mask FM in a manner to deviate from the optical axis Op at a certain angle thereto. This light beam passes through the third rectangular opening EO2 of the field mask FM, the third condenser lens LO2, the third field stops A5 and A6 of the aperture mask AM and the third re-imaging lens pair L5 and L6 to be condensed onto the third CCD line sensor PO2. This light beam re-forms a vertical pair of images on the third CCD line sensor PO2 for use in the focus detection.

On the other hand, a focus detecting light beam including main rays of light l1 and l2 and traveling from an object in a region including the optical axis Op of the objective lens passes through the first rectangular opening EO of the field mask FM on the optical axis Op, the first condenser lens LO, the first field stops A1 and A2 of the aperture mask AM on the optical axis Op, and the first re-imaging lens pair L1 and L2 to be condensed onto the first CCD line sensor PO. This light beam re-forms a sideways pair of images on the first CCD line sensor PO for use in the focus detection.

Focusing positions of the objective lens with respect to the photographic objects are detected by determining positions of the object images constituting the three pairs of images produced on the CCD line sensors PO, PO1 and PO2.

The above construction will be described further in relation to a field view in a viewfinder as shown in FIG. 3. The first CCD line sensor PO corresponds to an on-axis focus detecting region IS1, the second CCD line sensor PO1 to a lefthand off-axial focus detecting region IS2, and the third CCD line sensor PO2 to a righthand off-axial focus detecting region IS3. Focus detection may be carried out with respect to photographic objects in the three focus detecting regions IS1-IS3 located centrally on a screen S, which regions are indicated in solid lines. These regions are hereinafter referred to as the first to third islands IS1, IS2 and IS3 where distinction thereof is necessary. FIG. 3 includes a rectangular frame AF in a dotted and dash line, which indicates to the photographer a region for which the focus detection is carried out. A display spot Dfa outside the screen S indicates the focus detecting state, which turns on in green when the photographic object is focused and in red when the object cannot be focused. Reference Dfb denotes an LCD for displaying a moving object detected.

Figure 4:
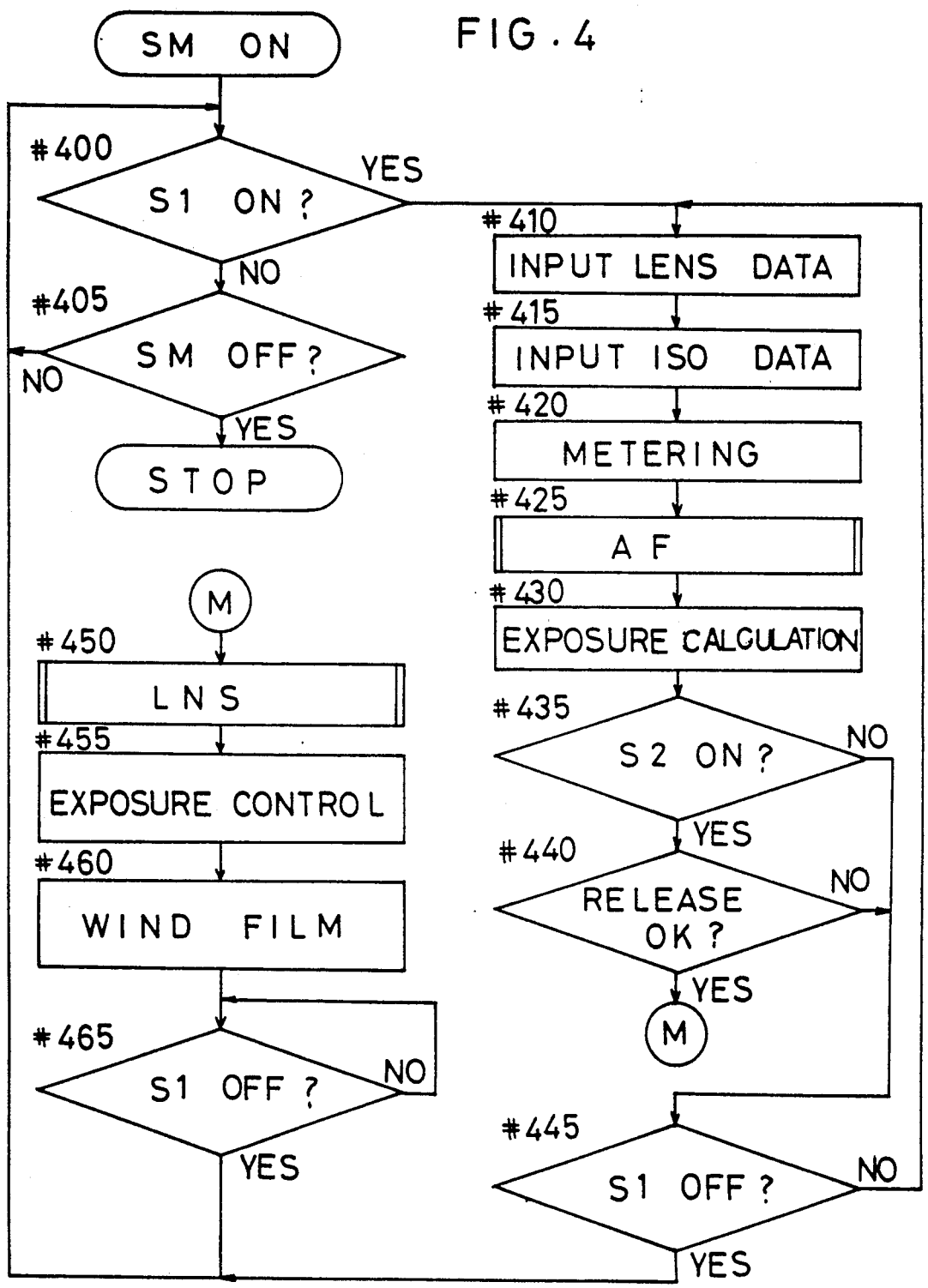
FIG. 4 is a flow chart illustrating a main routine of a CPU for controlling a camera operation.

Next, a camera operating sequence will be described with reference to the flow chart shown in FIG. 4.

The program starts when the main switch SM is turned on. Whether the metering switch S1 is closed or not is checked first at step #400. If the metering switch S1 is open, the program moves to step #405 for checking whether the main switch SM is opened. If the main switch SM remains closed, the program returns to step #400. This loop is repeated until the metering switch is closed. If step #405 finds the main switch SM opened, the microcomputer MC enters into a stop mode.

If step #400 finds the metering switch S1 closed, the lens data is input from the lens circuit LEC to the microcomputer MC at step #410. The lens data includes a conversion coefficient K for converting an amount of defocus into an amount of lens movement required for driving the lens to an in-focus position, the fully open diaphragm aperture value Avo of the objective lens, etc.

At step #415, the microcomputer MC receives ISO data Sv of the film from the film sensitivity reading circuit ISO. At step #420, a metering operation is carried out, and resulting metering data Bv is input from the metering circuit LMC to the microcomputer MC. At step #425, an autofocusing subroutine is called, the details of which will be described later. At step #430, an exposure calculation is carried out to determine a shutter speed Tv and an aperture value Av for exposure control.

Next, step #435 checks whether the shutter release switch S2 is closed or not. If closed, the program moves to step #440 for checking with a release permit flag, described later, whether shutter release is permitted or not. If shutter release is permitted, the program moves to step #450 for calling a subroutine "LNS" to calculate an amount of lens movement and effect lens drive control. This step is taken in order to compensate for defocusing which takes place during a release time lag, i.e. a delay from the closure of the shutter release switch S2 to the start of exposure. The subroutine "LNS" will be described in detail later.

If step #435 finds the release switch S2 open or if step #440 finds shutter release prohibited, the program moves to step #445 for checking whether the metering switch S1 is open or not. If the metering switch S1 is open, the program returns to step #400. Otherwise, the program returns to step #410 for repeating the metering, focus detecting and autofocusing operations.

After step #450 is executed for the focus compensation, a subroutine is called at step #455 for effecting an exposure control based on the shutter speed Tv and aperture value Av obtained at step #430. This exposure control subroutine will be described in detail later. Thereafter, at step #460, the film is advanced by one frame. At step #465, checking is made whether the metering switch S1 is open or not. If the metering switch S1 is open, the program returns to step #400.

Figure 5A:
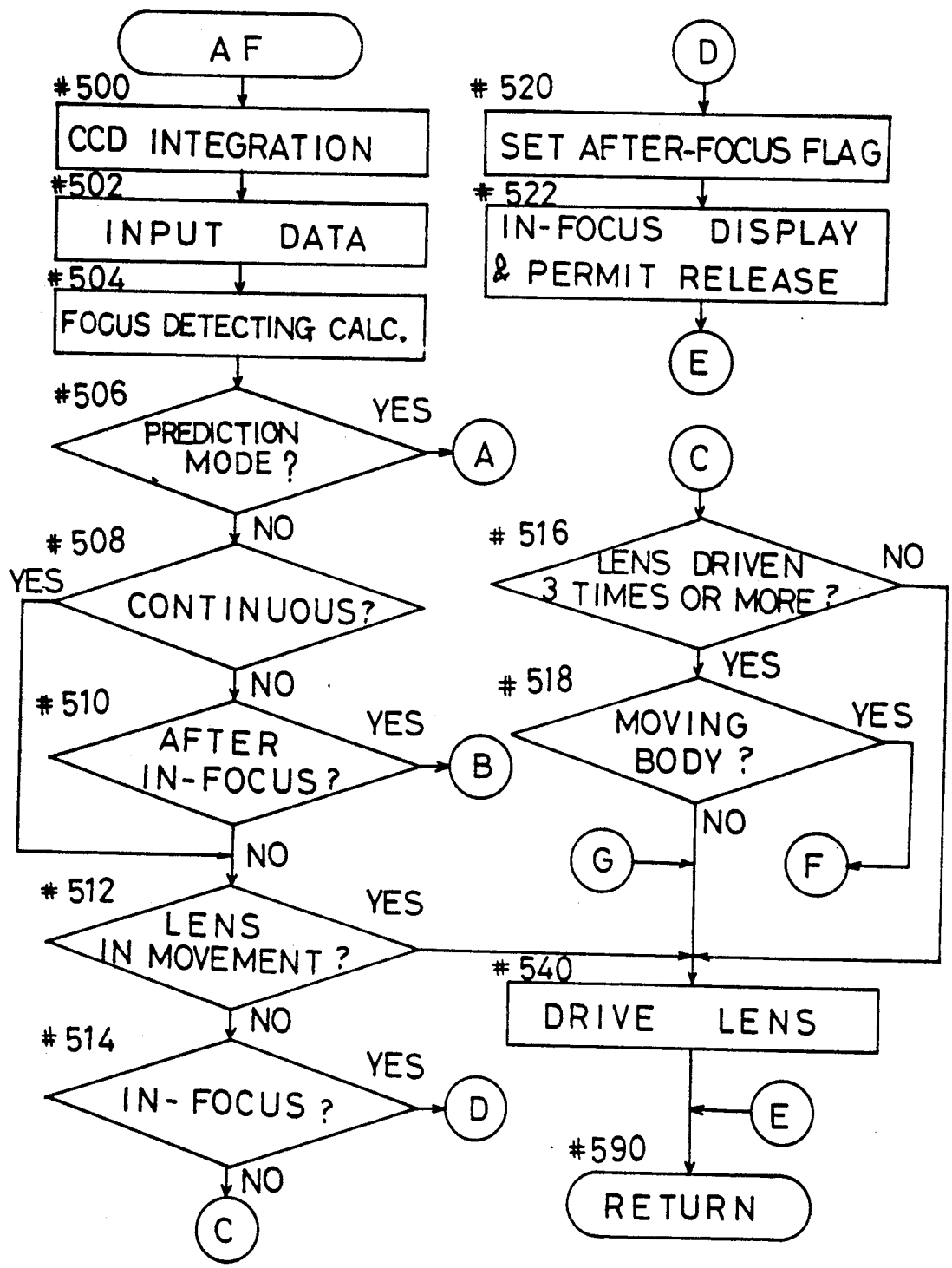
Figure 5C:
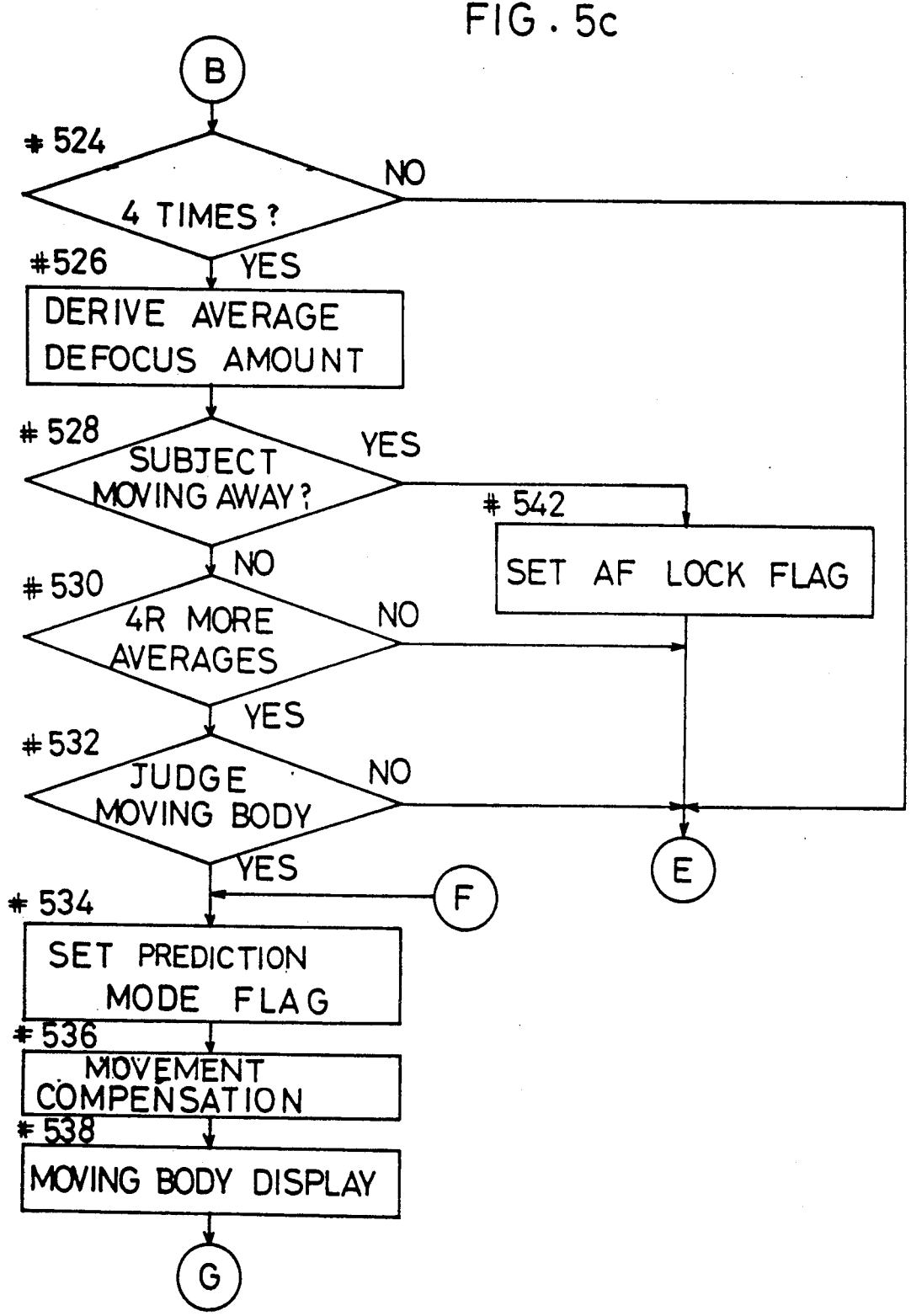

FIGS. 5a through 5c show a flow chart of the autofocusing subroutine called at step #425.

When this subroutine is called, an integration is first carried out at step #500 by the light receiving circuit CCD of the focus detecting circuit AFS. At step #502, the resulting pixel data at the light receiving circuit CCD are converted into digital data for input to the microcomputer MC. At step #504, a defocus amount is derived from these pixel data. The card information is also input from the card circuit CD at step #502. This card information indicates selection between a continuous autofocusing mode (in which the lens drive is continued during the release time lag) and the one-shot autofocusing mode (in which the objective lens is not driven after attaining an in-focus condition). In other words, the IC card transmits a forcible one-shot flag for forcibly setting the one-shot autofocusing mode (hereinafter referred to as the card one shot), or a continuous flag.

Step #506 judges whether the photographic object is a moving body or not by judging a prediction mode flag set when the object is judged a moving body. If the prediction mode flag is set, the program branches off to a prediction focusing mode sequence beginning with step #544. The program always moves to step #508 since it cannot be judged in the initial focus detecting operation whether the object is a moving body or not. Step #508 judges whether the continuous autofocusing mode is selected or not. The continuous autofocusing mode is selected either forcibly by the card information input from the IC card at step #502 or by the continuous flag set through step #552 to be described later.

Subsequently, step #510 judges from an after-focus flag described later whether the in-focus condition has been obtained. If it has after the program moves to a moving body judging sequence beginning with step #524. Step #512 judges whether the objective lens is in movement or not. If the lens is in movement, subsequent focus detection and moving body judgement are skipped to avoid poor precision due to the lens being driven. If it is not moving, the program moves to step #514 to judge whether the objective lens is in an in-focus zone or not. If it is in the in-focus zone, the after-focus flag is set at step #520 for use at step #510. Then, step #522 gives an in-focus display (the green indication on the display Dfa shown in FIG. 3), and sets the release permit flag for use in step #440.

If step #514 finds the lens outside the in-focus zone, step #516 checks if the lens has been driven three times or more. If the lens has been driven three times or more, step #518 judges from three previous past defocus amounts whether the photographic object is a moving body. If step #516 finds the lens not having been driven three times, the program moves to step #540 for driving the lens for focus adjustment, and returns to the main routine to execute step #500 for a further focus detecting operation.

If step #510 finds the after-focus flag set, the program moves to step #524 for checking whether the focus detecting operation has been repeated four times. If the focus detecting has not been repeated four times, the program returns to the main routine to execute step #500 for a further focus detecting operation.

If the focus detecting operation has been repeated four times, the program moves to step #526 for deriving an average defocus amount DFx from four defocus amounts obtained from the four focus detecting operations. Step #528 judges from two past average defocus amounts DFx whether the photographic object is moving away or not. If it is, the program moves to step #542 for setting a focus lock flag. When executing this sequence for the first time, the same average amount is used since two average amounts are not available.

If the object is not moving away, the program moves from step #528 to step #530 for checking whether four or more average defocus amounts DFx have been obtained. This checking is made because a moving body judgement at the next step #532 is made only when four average defocus amounts DFx are available. If four average defocus amounts are not available, the program returns to the main routine to execute step #500 for a further focus detecting operation.

If four average defocus amounts DFx are available, the moving body judgment is carried out based on these amounts at step #532. If the photographic object is judged a moving body, the program moves to step #534. Step #534 is executed also when step #518 judges the object to be a moving body.

Thus, there are two ways for judging the photographic object to be a moving body. Step #518 makes this judgment when the object is moving relatively fast. Step #532 makes the judgment when the object is moving relatively slowly. In either case, the program moves to step #534. These judgments at steps #518 and #532 are hereinafter referred to as the "moving body judging type I" and "moving body judging type II", respectively. When the object is judged a moving body, the prediction mode flag is set at step #534 which is used at step #506. Step #536 carries out a calculation for moving body compensation to determine an amount of lens movement by adding a predicted defocus amount due to the movement of the object to a normal defocus amount.

Subsequently, step #538 is executed for giving a moving body display (on the LCD Dfb shown in FIG. 3), and step #540 is executed for driving the lens. The foregoing operational mode for effecting the moving body compensation and lens drive is hereinafter referred to as the prediction focusing mode.

After the lens is driven in the prediction focusing mode, the program returns to the main routine and executes step #500 again. This time the program moves from step #500 to step #544 for calculating a moving body compensation. The moving body compensating calculation carried out at step #544 is different from the moving body compensating calculation carried out at step #536 for lens drive. The calculation of step #536 is intended for completion of a next focus detecting operation, whereas the calculation of step #544 is intended for completion of the current focus detecting operation.

Then step #546 is checked from the compensated value whether the lens is in-focus. If it is, step #548 is executed for giving the in-focus display and permitting shutter release. Subsequently, step #550 judges whether the direction of movement of the photographic object has been reversed during the prediction focusing mode. If it has, step #552 is executed for setting the continuous flag to initiate the continuous focusing mode. Then, step #554 is executed for clearing the prediction focusing mode.

If compensation were effected despite the reversal of the movement of the object, a delay would occur in the moving body compensation itself which is due to the time taken in the integration by the CCD line sensor for detecting the movement of the moving body. This could result in a compensation being made in a direction opposite to the movement to and fro of the moving body. The simple, continuous autofocusing mode is better able to follow the random to-and-fro movement of a moving body.

FIGS. 6a and 6b are sequence diagrams of the moving body judging types I and II, respectively. The moving body judging type I is applicable to a relatively fast moving object whose speed, in film plane conversion, is about 1.3 mm/s or more.

The moving body detection is started after lens driving steps following the first and second focus detecting operations A and B. This is because the first and second focus detecting operations A and B often accompany such inconveniences as lens drive backlashes and low detecting precision due to a great deviation from an in-focus position. Further, it often is the case that the moving object is not yet in an in-focus zone when the second focus detecting operation is carried out, because of an error in the conversion coefficient K between the defocus amount and the amount of lens drive. If the object is not focused with a third focus detecting operation C which is relatively free from such an error in the case of a stationary object, it clearly indicates that the object is a moving body. Thus, after the lens is driven based on the result of the third focus detecting operation C, a fourth and a fifth focus detecting operations D and E are carried out. If the object still remains out-of-focus, the prediction focusing mode is commenced only at this stage. Then the moving body compensation is effected by using the defocus amounts obtained from the last three focus detecting operations C, D and E. Specifically, the speed of the moving body is calculated by obtaining two average speeds, one of which is based on the defocus amounts detected through the focus detecting operations C and D, and the other based on the defocus amounts detected through operations D and E.

The in-focus zone is set to a small zone of 80 micrometers up to the focus detecting operation C. It is based on the premise that the object is stationary, and this size will assure in-focus. If the object falls within this zone, no further lens drive is necessary. The in-focus zone is enlarged for the fourth and subsequent focus detecting operations. This is based on the premise that the object is moving. The prediction focusing mode is employed after the moving body judging type I judges a moving object which moves 200 micrometers or more within one lens driving cycle following one focus detecting operation.

When the object is in the 200 micrometer in-focus zone, the moving body detection switches to the moving body judging type II. If the release switch S2 is closed before the moving body judging type II is initiated, the foregoing step #450 is executed for driving the objective lens. When the object is focused in the focus detecting operation C, the moving body judging type II is initiated.

In the moving body judging type II, four focus detecting operations are repeated successively with the objective lens standing still after the object is focused in the focus detecting operation C. As shown in FIG. 6b, the four focus detecting operations D1-D4 are carried out successively, and the defocus amounts obtained therefrom are averaged to provide an average defocus amount DFx. Thereafter, the focus detecting operations are repeated in fours E1-E4, F1-F4 and G1-G4, for providing respective average defocus amounts DFx. The resulting four average defocus amounts DFx are used for judging the moving body. This moving body judging type II is capable of detecting a moving body speed of 0.25 mm/s or more in the film plane conversion. When the moving body judging type II determines the object to be moving, the prediction focusing mode is initiated for the moving body compensation and moving body display.

FIGS. 7 and 8a-8c are flow charts illustrating the moving body detection utilizing the moving body judging types I and II. With reference to the flow charts shown in FIGS. 5a-5c, steps #516 and 518 represent the moving body judging type I, and steps #524 to #532 the moving body judging type II.

Figure 7:
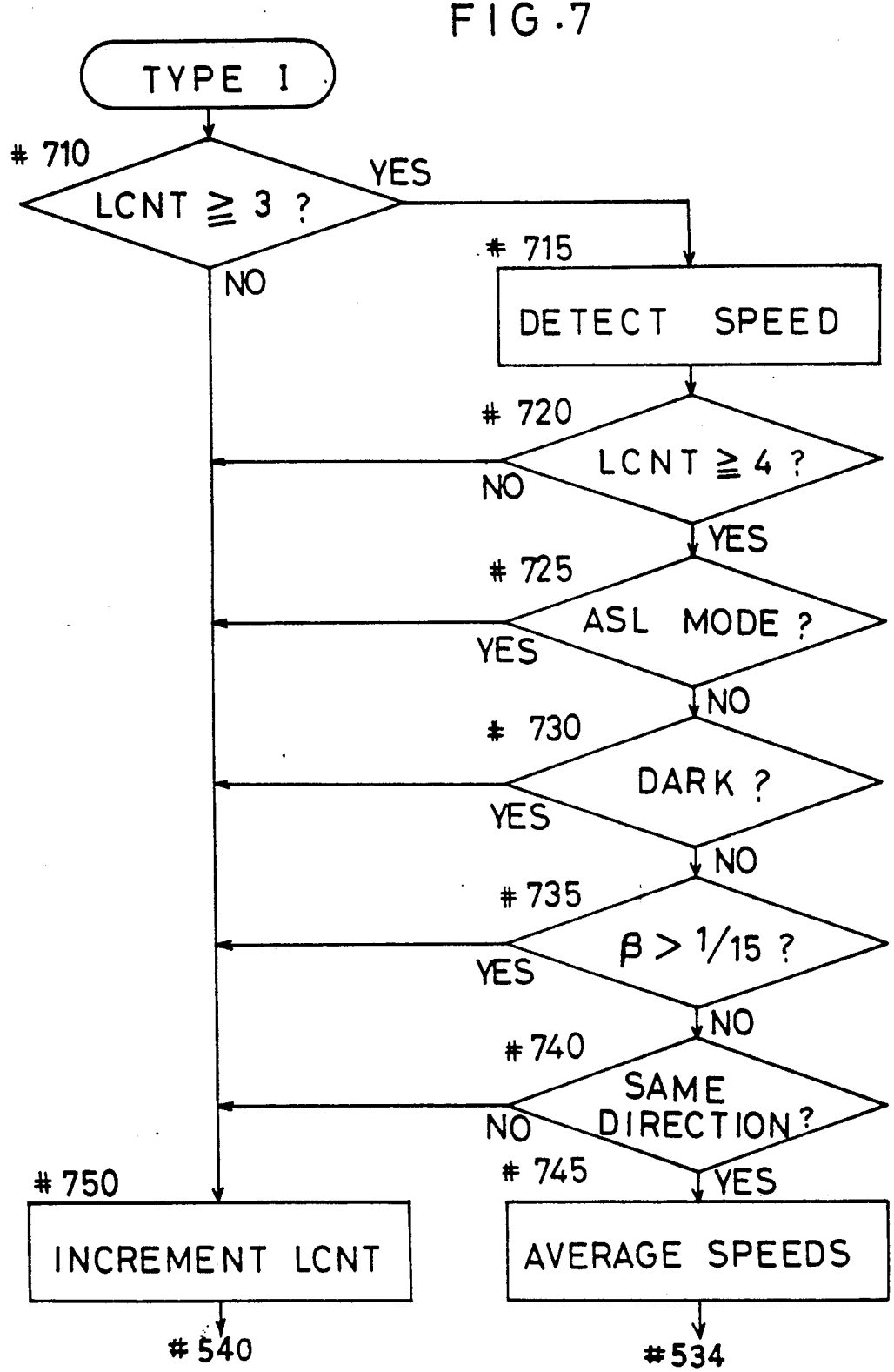
FIG. 7 is a flow chart of a moving body judging subroutine employed when a photographic object moves fast.

In the moving body judging type I shown in FIG. 7, step #710 is executed first to check if "LCNT" is 3 or more. The "LCNT" represents a drive counter for counting the number of times the lens is driven at step #540. This drive counter is cleared when the metering switch S1 is closed, and is incremented every time step #750 is executed. This drive counter is used for initiating the moving body judgment. If step #710 finds the lens to have been driven three times or more, the program moves to step #715 for determining the speed of the photographic object (which corresponds to the operations C and D in FIG. 6a). Subsequently, step #720 is executed for checking the drive counter again. If the count LCNT is "4", the moving body judgment is carried out (which corresponds to the operations D and E in FIG. 6a).

Various conditions are thereafter checked for the moving body judgment. Specifically, step #725 is executed for checking whether the camera is in the auxiliary light AF mode using the auxiliary light circuit ASL or not. If not, step #730 is executed for checking whether the photographic object is bright enough. The object is judged bright enough when the gain by the amplifier circuit AGC in the focus detecting circuit AFS is less than fourfold. Then step #735 is executed for checking if the magnification rate $\beta$ of the object is greater than a predetermined value 1/15. This checking is made since a high magnification rate produces great variations in the focus detecting results which cause serious detection errors. Thereafter, step #740 is executed for checking whether the object is moving in the same direction or not. This checking is made on the basis of last two speed detections carried out at step #715 (which result from the operations C and D and the operations D and E in FIG. 6a). If the above conditions are satisfied, the program moves to step #745 for averaging the detected speeds of the object for use in steps #534 et seq.

Figure 9:
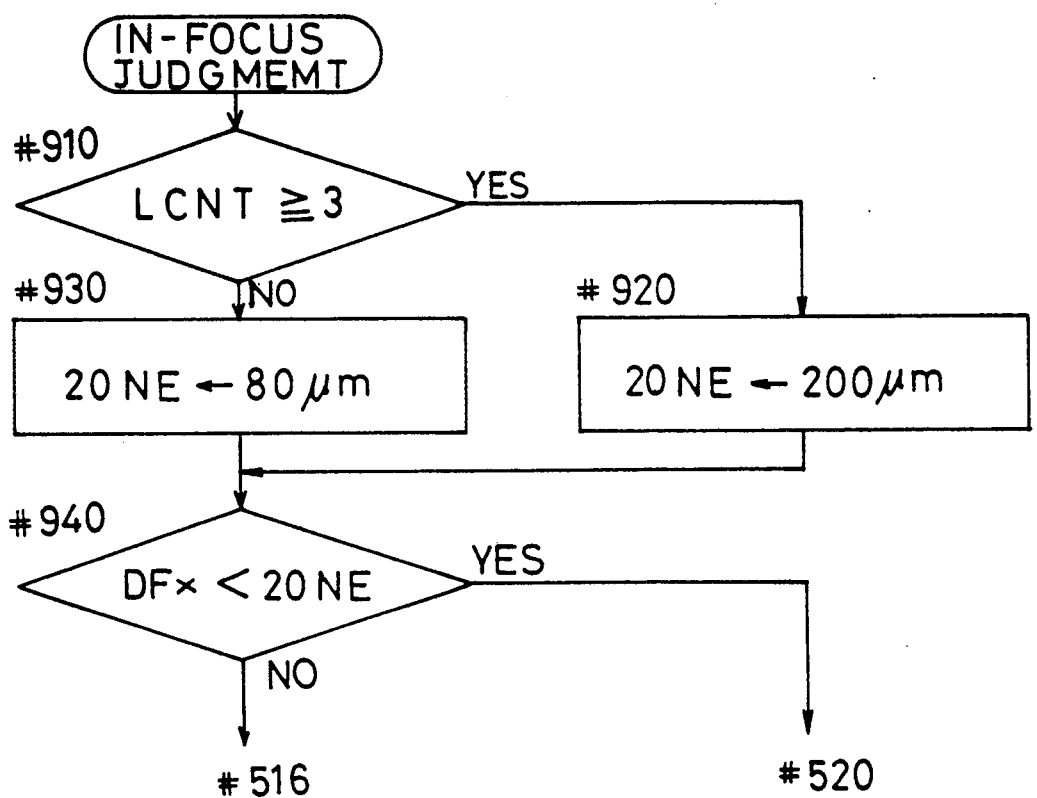
FIG. 9 is a flow chart of an in-focus judging subroutine.

There is another condition to be satisfied in the moving body judging type I. This is the in-focus zone judgment carried out at step #514, details of which will be described next with reference to FIG. 9.

In this sequence, step #910 is first executed for checking the drive counter. If the count LCNT is "3" or more, the program moves to step #920 for setting the in-focus zone to 200 micrometer. If not, step #930 is executed for setting the in-focus zone to 80 micrometers. (The zone is set to 80 micrometers as a result of the operations A, B and C, and to 200 micrometers as a result of the operations D and E in FIG. 6a). Thus, the in-focus zone is set to 200 micrometers in most cases where the continuous AF is carried out. At step #940, the defocus amount DF resulting from the focus detecting operations is compared with the in-focus zone set at step #920 or #930. If the object is in-focus, the program moves to step #520. Otherwise, the program moves to step #516.

Figure 8A:
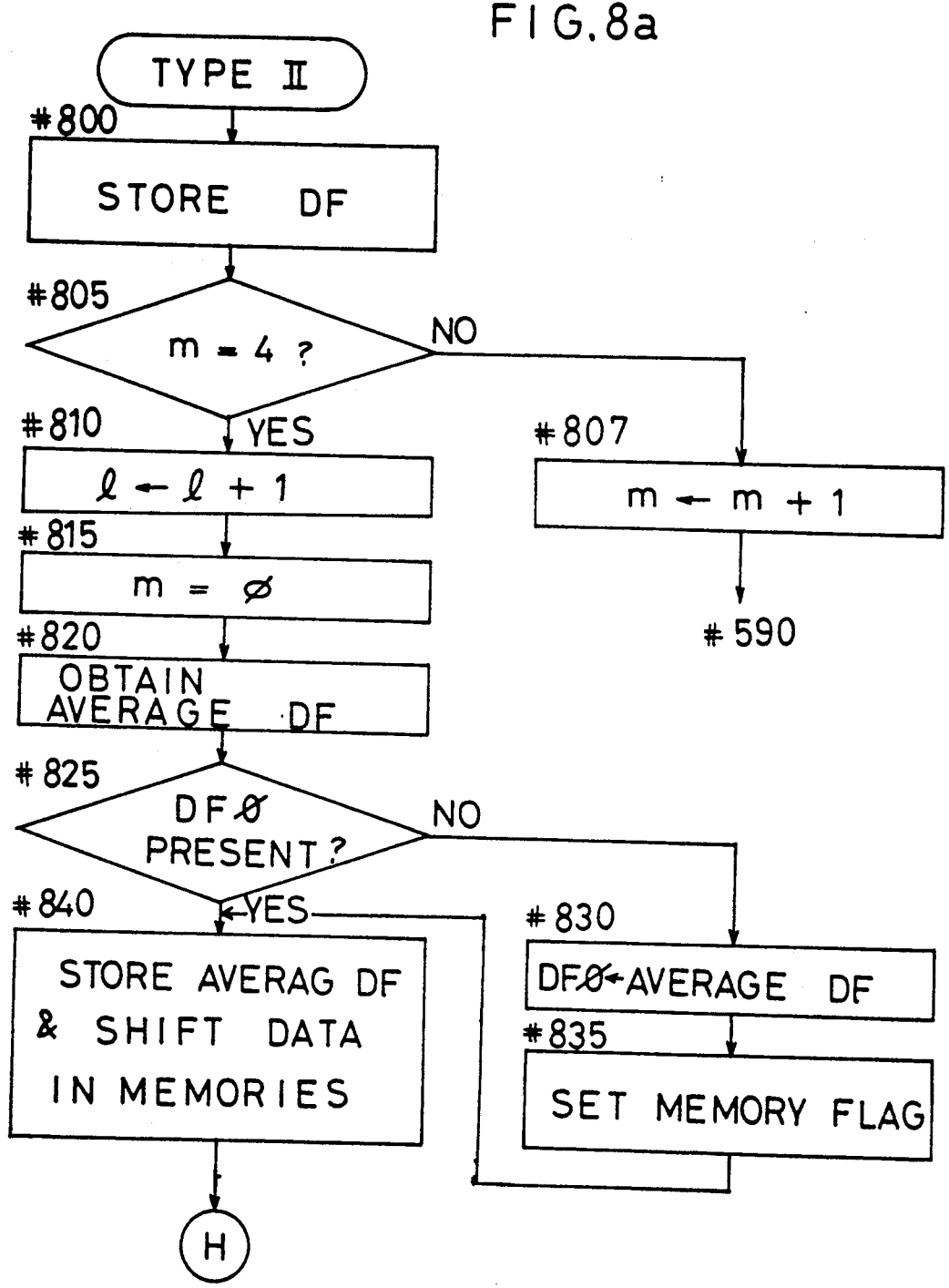
FIGS. 8a through 8c are a flow chart of a moving body judging subroutine employed when a photographic object moves slowly.
Figure 8B:
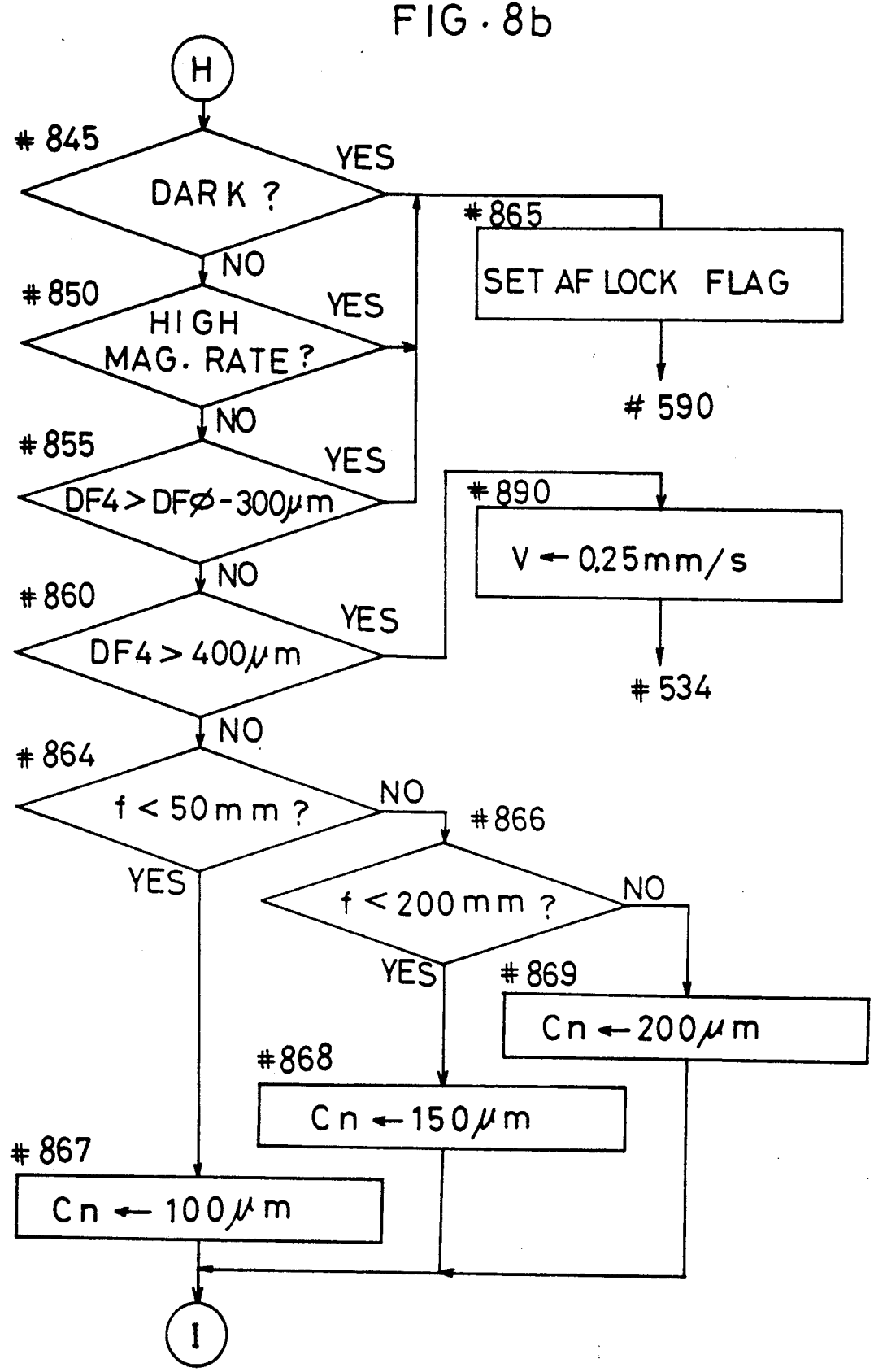
Figure 8C:
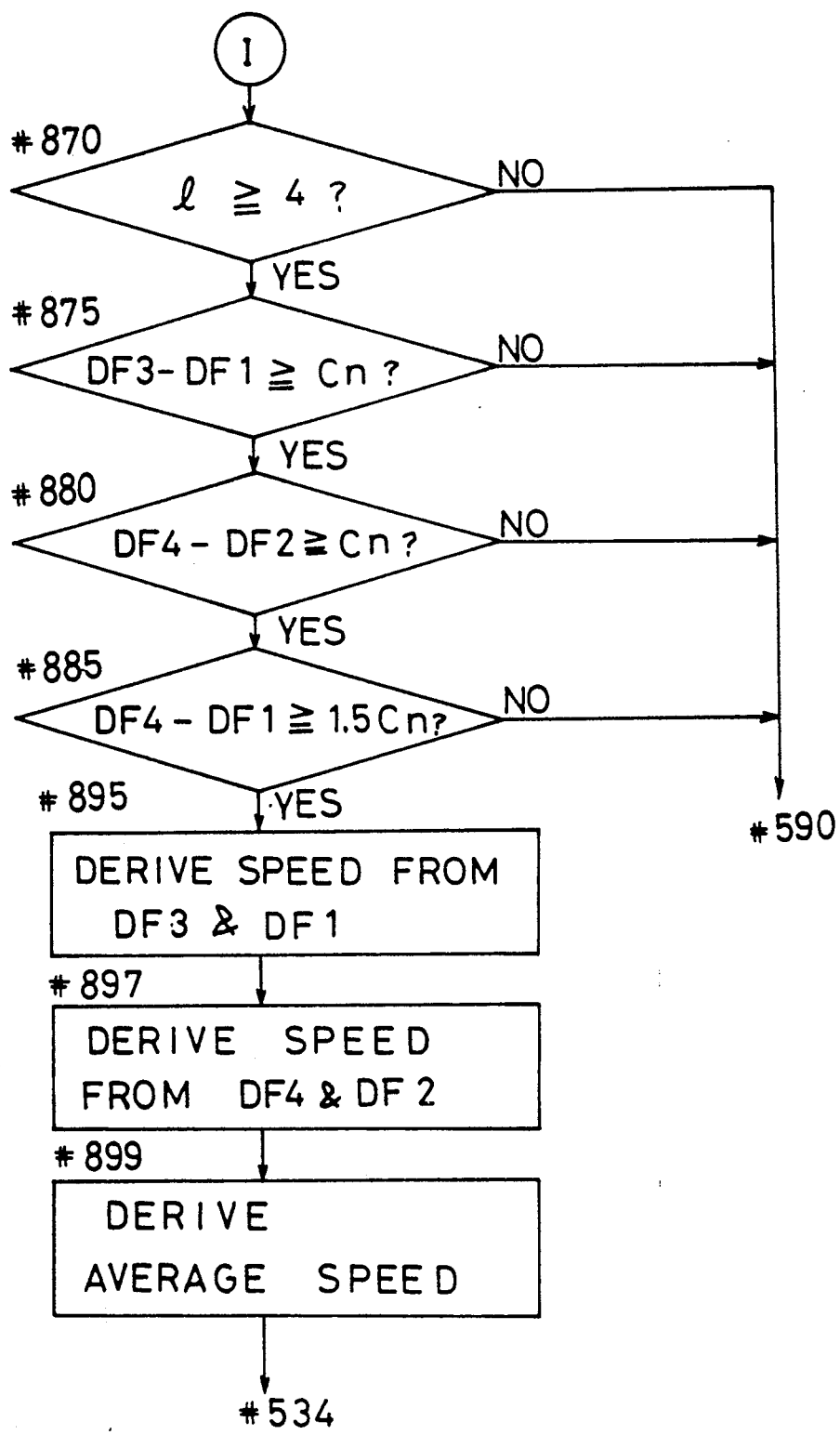

FIGS. 8a through 8c show the moving body judging type II. Assume that a memory for storing a sum of defocus amounts DF is cleared with the closure of the metering switch S1, and that the after-focus sequence at steps #524 et seq. is started as a result of the judgment made at step #510. First, at step #800, the defocus amount DF obtained in the latest focus detecting operation is stored as added to the sum in the above-mentioned memory. Step #805 is executed for judging whether four successive focus detecting operations are completed or not. If not, the program moves to step #807 for incrementing a first judgment counter m, and then returns to the step #590 of the main routine.

If it is, step #810 is executed for incrementing a second judgment counter l which is for judging how many times the four successive focus detecting operations are carried out. At step #815, only the first judgment counter m is cleared. It should be noted that these two counters l and m are cleared upon closure of the metering switch S1.

At step #820, the sum of four defocus amounts DF are divided by 4 for producing an average defocus amount DF. Step #825 checks, by means of a memory flag to be described later, if a memory stores a first value DFO of this average defocus amount DF after an in-focus condition is attained (which is hereinafter referred to as the base defocus amount DFO). The program moves to step #840 if the base defocus amount DFO is present in the memory. Otherwise, step #830 is executed for setting the first average defocus amount DF to be the base defocus amount DFO. At step #835, the memory flag used at step #825 is set.

At step #840, the average defocus amount DF obtained at step #820 is stored in a memory DF4, and data in four memories DF4, DF3, DF2 and DF1 are shifted in succession. Thus, the latest average defocus amount DF is always stored in the memory DF4.

Steps #845, #850 and #855 are executed for exiting the moving body judgment and carrying out judgment for the AF lock. The program moves to step #865 for setting an AF lock flag and returns to step #590 of the main routine if step #845 judges the photographic object to be dark, that is the gain by the amplifier circuit AGC of the focus detecting circuit AFS is fourfold or eightfold, if step #850 finds the rate of magnification is greater than 1/15 in which case variations occur with the results of focus detecting operations, or if step #855 finds that a comparison between the latest average defocus amount DF4 and the base defocus amount DF0 shows a movement more than 300 micrometers away from the camera.

When results of judgment at steps #845, #850 and #855 show negative and step #860 finds that the latest average defocus amount DF4 shows a movement more than 400 micrometers toward the camera, the program jumps to step #890 instead of executing subsequent moving body judging steps. At step #890, the speed V of the object is set to 0.25 mm/s which is a minimum speed for maintaining the prediction focusing mode. Then the program returns to step #534.

Otherwise, steps #864 and #866 are executed for judging a focal length f of the objective lens and switching a moving body judging level used at steps #875 et seq. If step #864 finds the focal length f to be shorter than 50 mm, step #867 sets the judging level Cn to 100 micrometers. If step #866 finds the focal length f to be shorter than 200 mm, step #868 sets the judging level Cn to 150 micrometers. If step #866 finds the focal length f to exceed 200 mm, step #869 sets the judging level Cn to 200 micrometers. The judging level Cn is used for judging a difference between two values of the average defocus amount DF.

Figure 21:
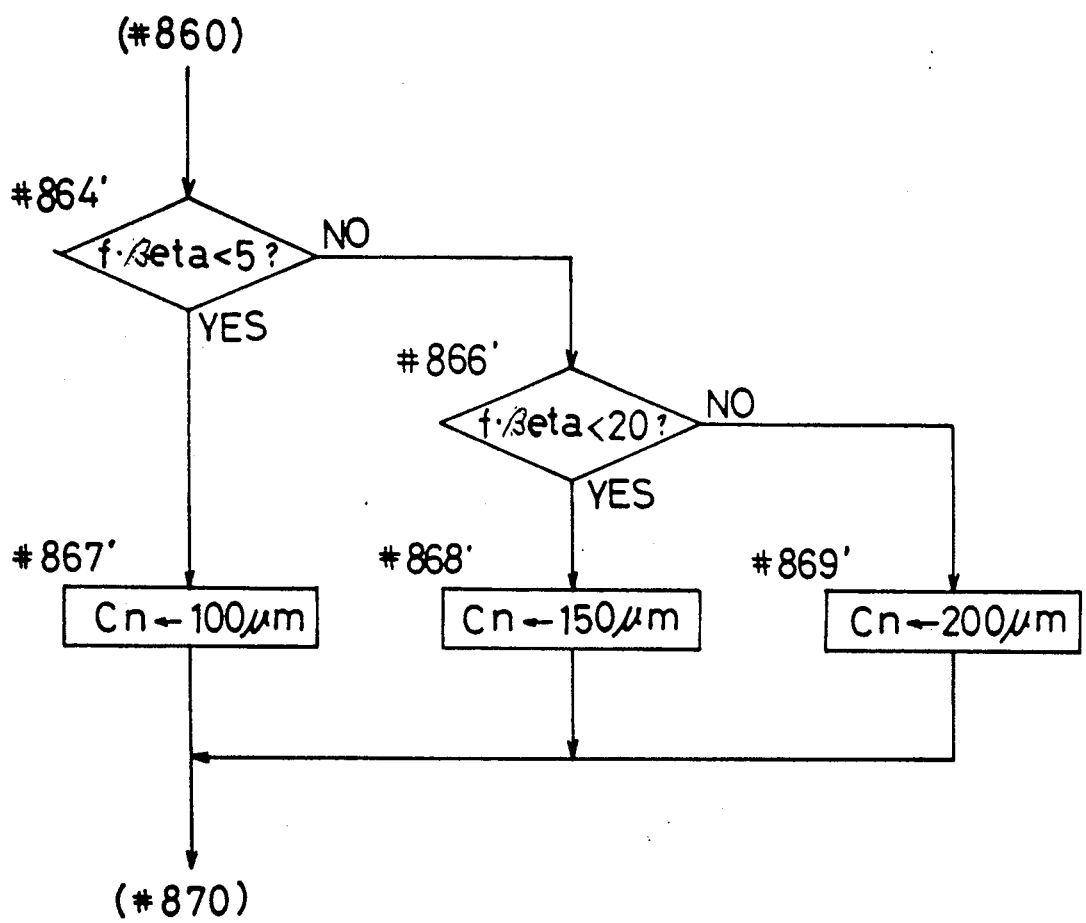
FIG. 21 is a flow chart of a subroutine executed for switching a moving body judging level based on a photographic magnification rate.

The switching of the moving body judging level Cn executed at steps #864 through #869 may be effected in different ways. One example is shown in FIG. 21. In this example, the judging level Cn is switched by using as a judging criterion the product f·β of the focal length f and photographic magnification β which corresponds to the defocus amount on the film.

If steps #864' and #866' find the product f·β to be smaller than "5", step #867' sets the judging level Cn to 100 micrometers. If the product f·β is "5" or more but smaller than "20", step #868' sets the judging level Cn to 150 micrometers. If the product f·β is "20" or more, step #869' sets the judging level Cn to 200 micrometers. Then the program moves to step #870.

Returning to FIG. 8, step #870 is executed for judging how many times the four successive focus detecting operations have been carried out, that is whether there are four average defocus amounts DF each derived from the four successive operations. In the presence of the four average defocus amounts DF, the moving body judgment is carried out at steps #875 et seq. The moving body judgment determines the photographic object to be a moving body when three conditions are all satisfied. The three conditions are that DF3 minus DF1 is not less than Cn, DF4 minus DF2 is not less than Cn, and DF4 minus DF1 is not less than 1.5 times Cn. The 1.5 times Cn is provided for the final condition since the span is 1.5 times that of other cases.

Next, at step #895, a speed V1 of the object is derived from the two average defocus amounts DF3 and DF1 and a time interval between these two focus detecting operations. Similarly, at step #897, a speed V2 of the object is derived from the two average defocus amounts DF4 and DF2 and a time interval between the two focus detecting operations. At step #899, an operation V=(V1+V2)/2 is carried out for obtaining an average speed V from the two speeds V1 and V2. Then the program moves to step #534.

In the moving body compensation, the average object speed V is used for predicting a defocus amount occurring when a next focus detecting operation is completed. An amount of lens drive is obtained by taking the predicted defocus amount into account, for repeating the focus adjusting operation. When an in-focus condition is attained, the shutter release operation is carried out. In carrying out the shutter release operation, the release switch S2 may be closed before or after the in-focus condition is attained. The closure of the release switch S2 initiates the exposure control. The camera is constructed such that light does not enter the focus detecting optical system AO during the exposure control.

Figure 10A:
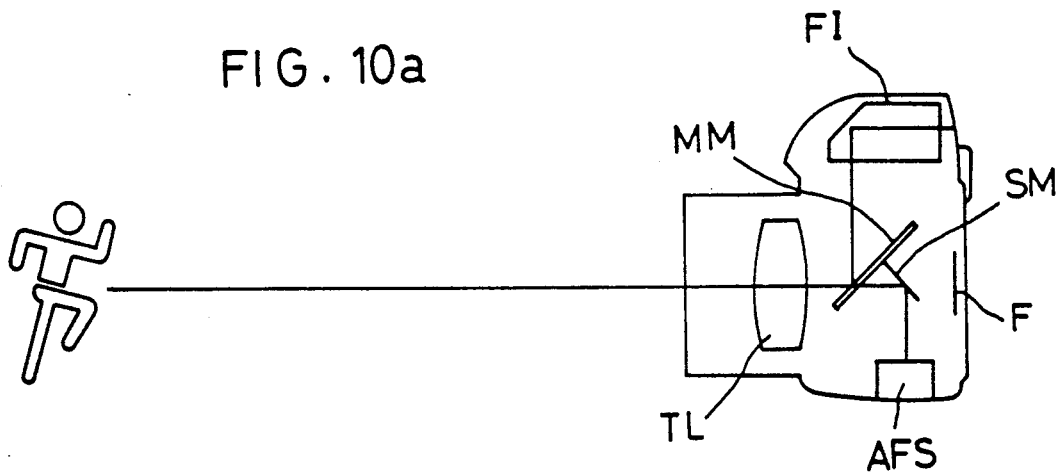
FIGS. 10a through 10b are schematic views illustrating the relationship between movement of a photographic object and operation of the camera.
Figure 10B:
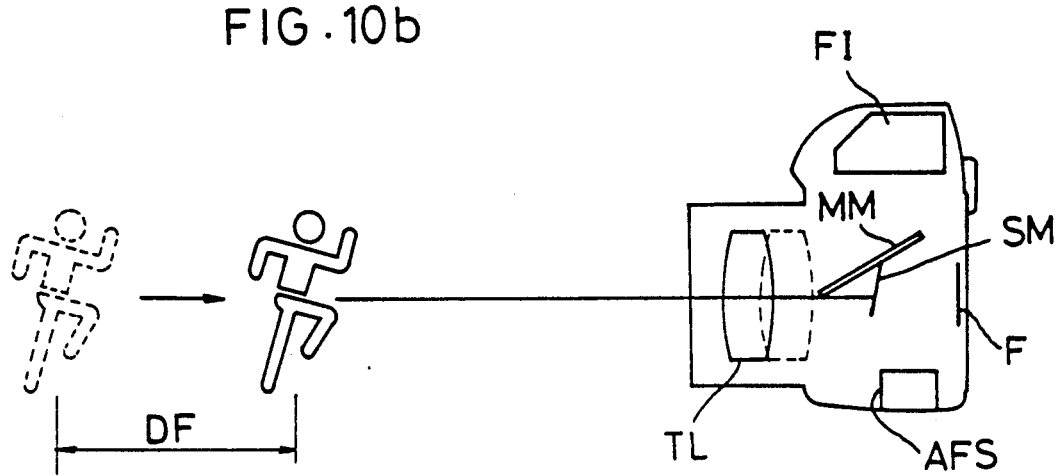
Figure 10C:
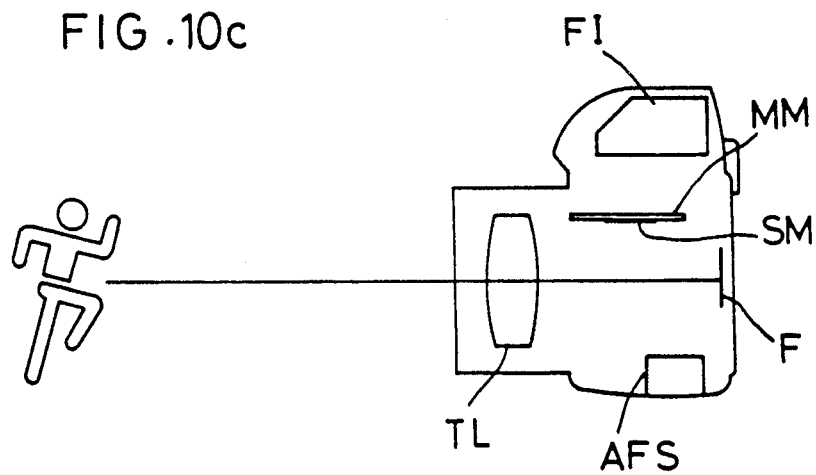

The moving body compensation will be described next with reference to FIGS. 10a through 10c. The bundle of rays for forming the image of the object on the film F passes through the objective lens TL. Then the bundle of rays is reflected by a semitransparent main mirror MM to a finder optical system FI, and by a sub mirror SM to the focus detecting optical system AO. The light will be reflected in other directions if the mirrors are lifted with start of the exposure control. If the object is moving at this time, the object becomes out-of-focus. In order to compensate for the defocusing during this release time lag (which is hereinafter referred to as the focus compensation), the lens is driven during the mirror lift (which is hereinafter referred to as the drive during the mirror lift) to cover a shortage in the amount of lens movement occurring during the release time lag. In FIGS. 10a through 10c, the drive during the mirror lift compensates for a defocus amount corresponding to a distance DF of movement of object.

Figure 11:
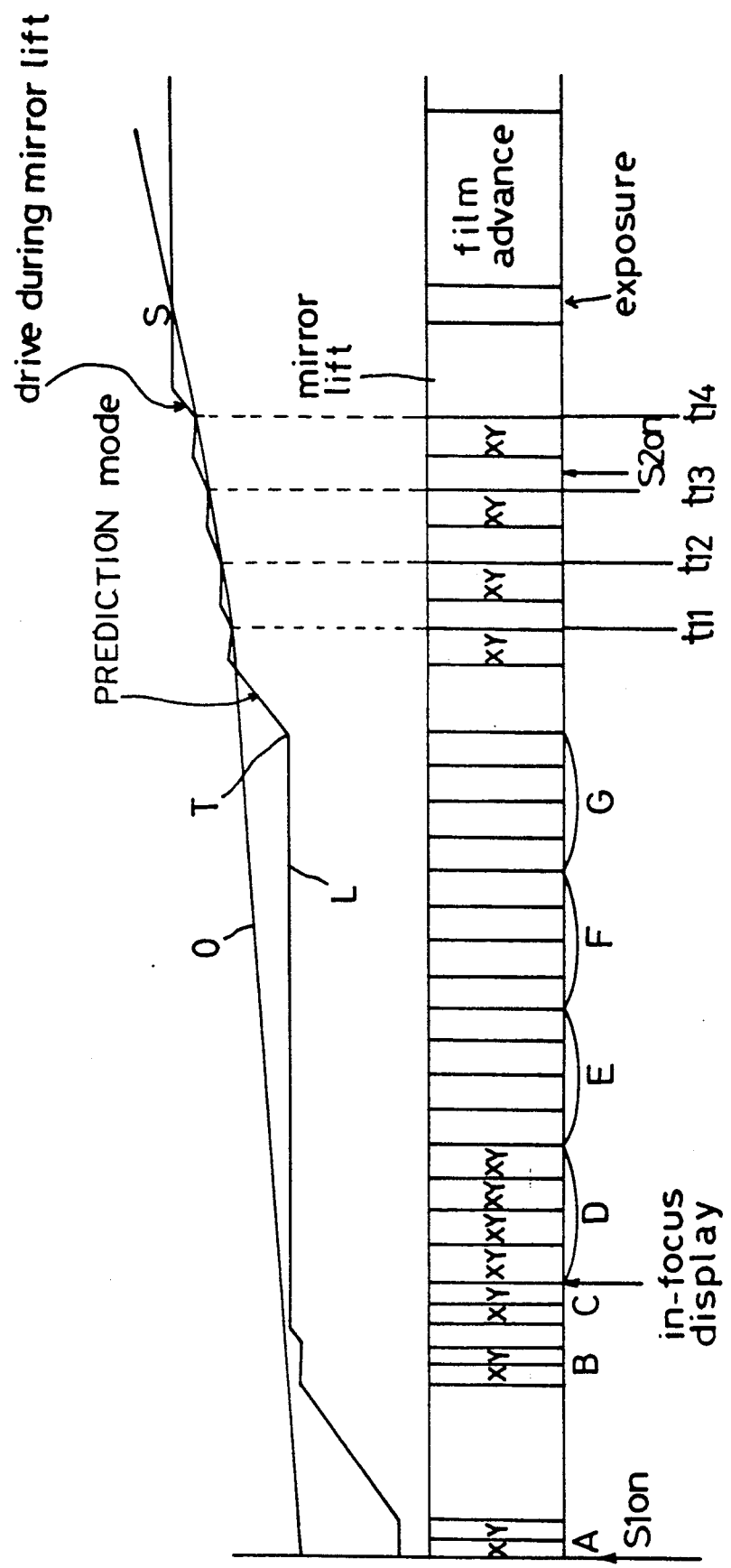
FIG. 11 is a time chart of a focus adjusting operation illustrating lens drive effected during a mirror lift for focus compensation with respect to an object moving slowly.
Figure 12:
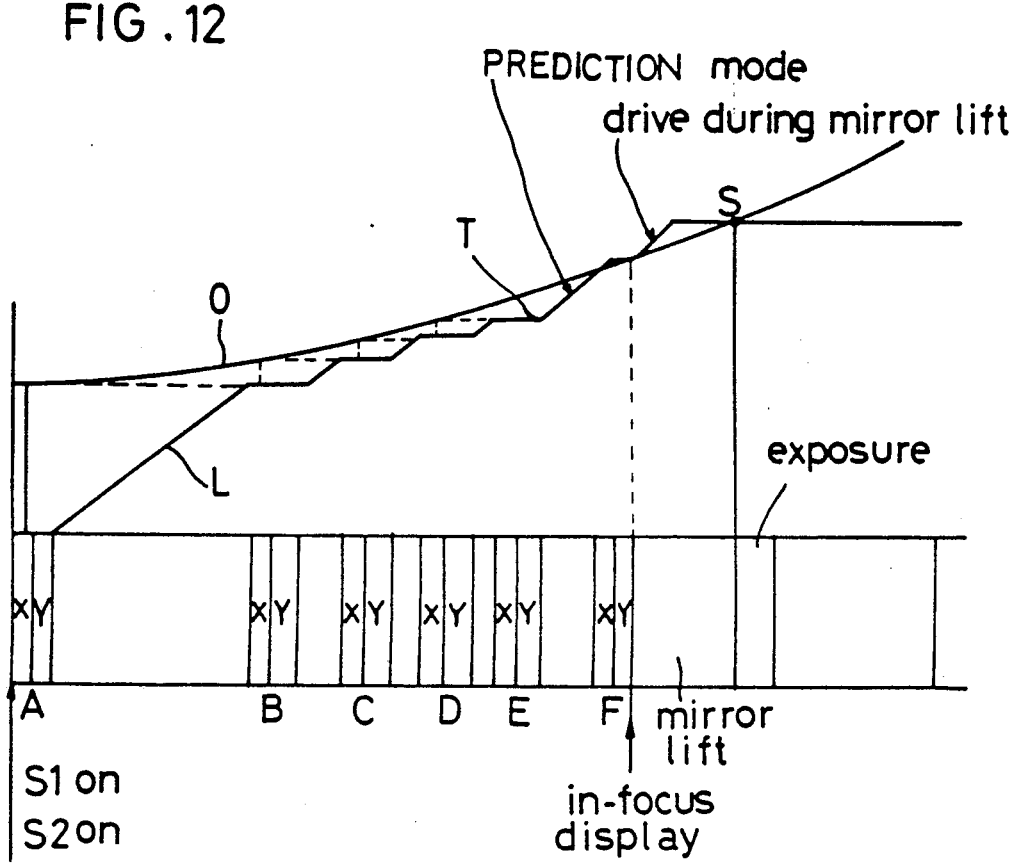
FIGS. 12 and 13 are time charts of a focus adjusting operation illustrating lens drive effected during a mirror lift for focus compensation with respect to an object moving fast.
Figure 13:
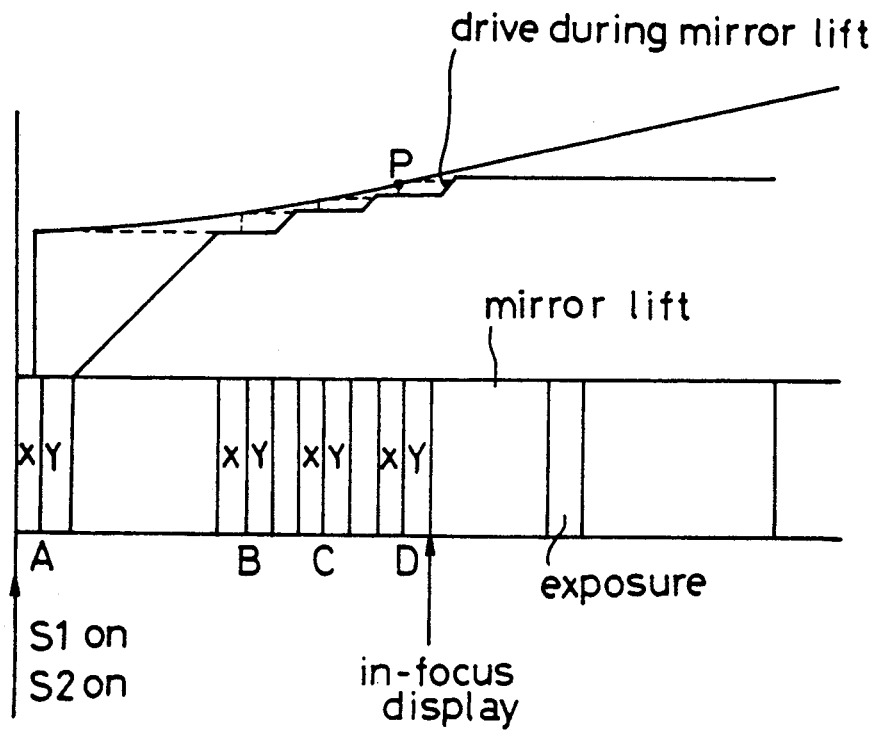

FIGS. 11 through 13 illustrate the drive during the mirror lift for the focus compensation. The horizontal axis therein represents time, while the vertical axis represents positions of the image plane.

FIG. 11 shows the case of the moving body judging type II. Reference X denotes integration timing, reference Y denotes calculation timing, curve O indicates the movement of a photographic object, and straight line D indicates lens movement. The object speed in FIG. 11 is very slow, and includes that of the object having just started moving.

An in-focus condition is attained after the focus detecting operation C, and the object is judged a moving body through the subsequent four successive focus detecting operations D-G repeated four times. The prediction focusing mode is started at a point of time T. In the prediction focusing mode, the lens movement is controlled such that the defocus amount is zero when the respective calculations end at points of time t11, t12, t13 and t14. When, for example, an interrupt occurs as a result of the closure of release switch S2 between the points of time t13 and t14, the mirror lift starts at the next point of time t14. The drive during the mirror lift is effected for a defocus amount occurring during the mirror lift. The objective lens is thus driven, whereby the defocus amount is zero at a point of time S at which the exposure operation is started.

FIG. 12 shows the case of the moving body judging type I. It is assumed here that the metering switch S1 and release switch S2 are closed from the beginning. The same operation as shown in FIG. 12 takes place whenever the release switch S2 is closed prior to the focus detecting operation F. In the moving body judging type I, the object moves fast and cannot be focused through the focus detecting operations A to F. Thus, as described with reference to FIG. 6, the prediction focusing mode is started at the point of time T after the lens is driven four times. An in-focus condition is attained with the operation F for allowing a shutter release operation. In this case too, the drive during the mirror lift is effected, and the objective lens is driven so that the defocus amount is zero at the point of time S at which the exposure operation is started.

FIG. 13 shows a case with the same object as in FIG. 12, in which an in-focus condition is attained with the focus detecting operation D for initiating enlargement of the in-focus zone. The prediction focusing mode is not started in this case. However, considering the in-focus zone enlarged to 200 micrometers, a defocus of at least 200 micrometer could occur at the exposure time. In order to compensate for this defocus, the drive during the mirror lift is carried out for compensating for the defocus amount obtained from the focus detecting operation D (the defocus amount up to a point of time P).

This method enables the photographer to photograph an object which does not require the prediction focusing mode, without involving a releasing delay due object being out-of-focus. Although the shutter is released with the in-focus zone enlarged, the defocus due to the enlarged in-focus zone is minimized by the drive during the mirror lift.

TABLE 1

| Modes | Cases | Drive during mirror lift | Notes |
|---|---|---|---|
| AF lock | *Camera is deflected<br>*Object is moving away<br>*Object is dark<br>*Magnification rate is high | OFF | |
| moving body mode | *Object is moving fast<br>*Object is moving closer | ON (with compensation) | Drive with max. of 110 pulses in drive during pre-release or drive during mirror lift |
| non-moving body mode | *Release is started before in-focus condition (including simultaneous closure of S1 & S2)<br>*Continuous AF | ON (without compensation) | Drive by defocus amount at in-focus confirmation |
| | *Object is stationary or moving slowly | ON (without compensation) | Only when average defocus amount is 70-200 um |

Table 1 shows various cases of the drive during the mirror lift. The drive during the mirror lift is not always effected, but is switchable on and off according to the autofocusing modes.

The AF lock is established when the focusing is fixed at the will of the photographer such as when the camera is deflected (step #855), when the object is dark or magnification is set to a high rate which results in low precision of the moving body detection (step #845 or #850), or when the object is slowly moving away so that the prediction focusing mode is not required (step #855). The drive during the mirror lift is not effected at a time of the AF lock since it would result in a bad photograph.

The prediction focusing mode is started when the object is moving closer or moving at high speed as already described. Thus, the drive during the mirror lift is effected, followed by a further calculation for the moving body compensation to attain an in-focus condition at the exposure time. The mirror lift, however, is carried out within a limited period of about 70 ms, which sets a limit to the amount of drive during the mirror lift. Since it is necessary for the lens to stop for actual exposure, the lens is driven while being braked during the 70 ms period. Therefore, the amount of movement is smaller than when driven by the normal full drive, and the pulse count for this lens drive is 40 pulses. Where the lens has a greater focal length than the standard lens (50/1.7), the lens may be driven at least an amount corresponding to this count even if the lens stands still at an end of the 200 micrometer in-focus zone.

When the necessary amount of lens drive exceeds 40 pulses, the mirror lift is delayed 40 ms during which the lens is driven. There is a limit to the amount of lens drive before the shutter release operation so as not to extend the release time lag (with an increase of only 40 ms). Since full speed lens drive is possible at this time as distinct from the drive during the mirror lift, 70 pulses are secured for the lens drive which results in a total of 110 pulses. Consequently, 2000 micrometers are secured as the amount of lens movement where the conversion coefficient K is small. About 100 micrometers are secured where the coefficient K is large. These values are sufficient for the purpose of focus compensation.

In the case of non-prediction mode, the release switch S2 is closed before the in-focus condition. If the photographic object is moving very slowly, the shutter release operation may be carried out instantly without entering into the prediction focusing mode (see FIG. 13). In this case and in the case of continuous AF, the mirrors are lifted without effecting the moving body compensation (which is unnecessary in the method of this embodiment). The amount of drive is calculated from the result of a focus detecting operation taking place immediately before the mirror lift. Where the object is stationary or moving slowly, the moving body judgment is repeated after the in-focus condition is attained. If an interrupt occurs during this time resulting from the closure of the release switch S2, the drive during the mirror lift is effected all the same without the moving body compensation. At this time, judgment cannot be made whether the photographer is attempting to photograph a stationary object or an object moving slowly. When, for example, the AF lock is desired, the drive during the mirror lift would result in a photograph contrary to the photographer's intention.

The mirror lift is not effected if the photographic object is in the in-focus zone or if the camera is deflected. If the object has just been focused, the lens is moved slightly by the drive during the mirror lift on the assumption that the object is moving slowly. The above three phenomena are fulfilled by a control method wherein the drive during the mirror lift is effected only when the defocus amount is 70 to 200 micrometers. If the defocus amount is less than 70 micrometers, the object is judged to be inside the in-focus zone. If the defocus amount is over 200 micrometers, the camera is judged to be deflected. If the defocus amount is 70 to 200 micrometers, the object is judged to be moving.

Figure 14:
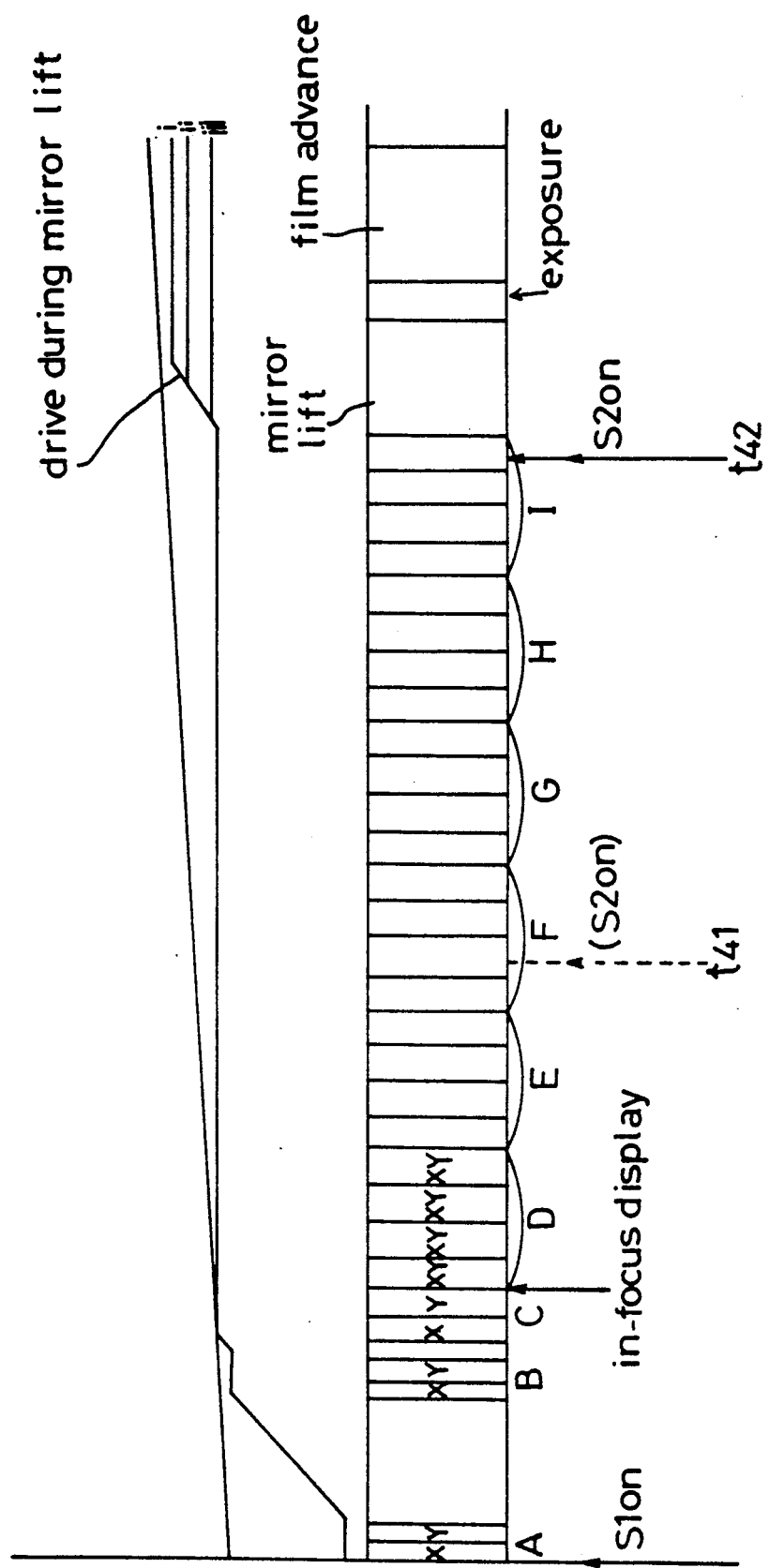
FIG. 14 is a time chart of the focus adjusting operation illustrating switching of an amount of drive for the lens drive effected during the mirror lift for focus compensation.

The amount of drive will be described with reference to FIG. 14.

Since the object is focused in the focus detecting operation C, the focus detecting operation D is better suited for averaging in view of the variations in the focus detecting operations. The amount of drive during the mirror lift effected while the moving body judgment is carried out, is determined on the basis of the average defocus amount. Where the release switch S2 is closed before starting the prediction focusing mode assuming that the object is moving, the drive during the mirror lift should desirably be effected by using the defocus amount DFi obtained from the latest set of focus detecting operations (which is the average defocus amount obtained from the focus detecting operations referenced I, resulting in a line i in FIG. 14). Where the object is stationary, the point of time at which the object is focused appears in the viewfinder. Therefore, the drive during the mirror lift should desirably be effected by using the defocus amount DFd obtained from the set of focus detecting operations carried out immediately after attaining the in-focus condition (which is the average defocus amount obtained from the focus detecting operations referenced D, resulting in a line iii in FIG. 14). Where the camera is slightly deflected with the AF lock (a deflection of the camera undetectable at step #855), the drive during the mirror lift should desirably be effected by using the defocus amount DFg obtained from the set of focus detecting operations carried out about 0.8 seconds from attainment of the in-focus condition (which is the average defocus amount obtained from the focus detecting operations referenced G, resulting in a line ii in FIG. 14).

The above assumptions signify cameras placing emphasis on such features. That is, presetting may be made as to which focus detecting operations should provide the defocus amount for effecting the drive during the mirror lift, to suit the fictitious user of the camera.

For control with greater subtlety, it is desirable that switching is made as to which focus detecting operations should provide the defocus amount for effecting the drive during the mirror lift, in accordance with the time period from attainment of the in-focus condition to the closure of the release switch S2. The time from attainment of the in-focus condition to deflection of the camera mentioned above is 0.8 to 1 second. Therefore, if an interrupt occurs resulting from the closure of the release switch S2 at a point of time t41 in FIG. 14 before the focus detecting operations G carried out after 0.8 second from attainment of the in-focus condition, the drive during the mirror lift is effected by using an average defocus amount Dfe obtained from the set of focus detecting operations E which is the latest at that point of time. If an interrupt occurs resulting from the closure of the release switch S2 at a point of time t42 after the focus detecting operations G, the drive during the mirror lift is effected by using the average defocus amount Dfd obtained from the set of focus detecting operations D.

This enables the photographer deflecting the camera for the AF lock after 0.8 second from the attainment of an in-focus condition, to carry out a shutter release operation for taking a photograph in a desired composition.

Figure 15A:
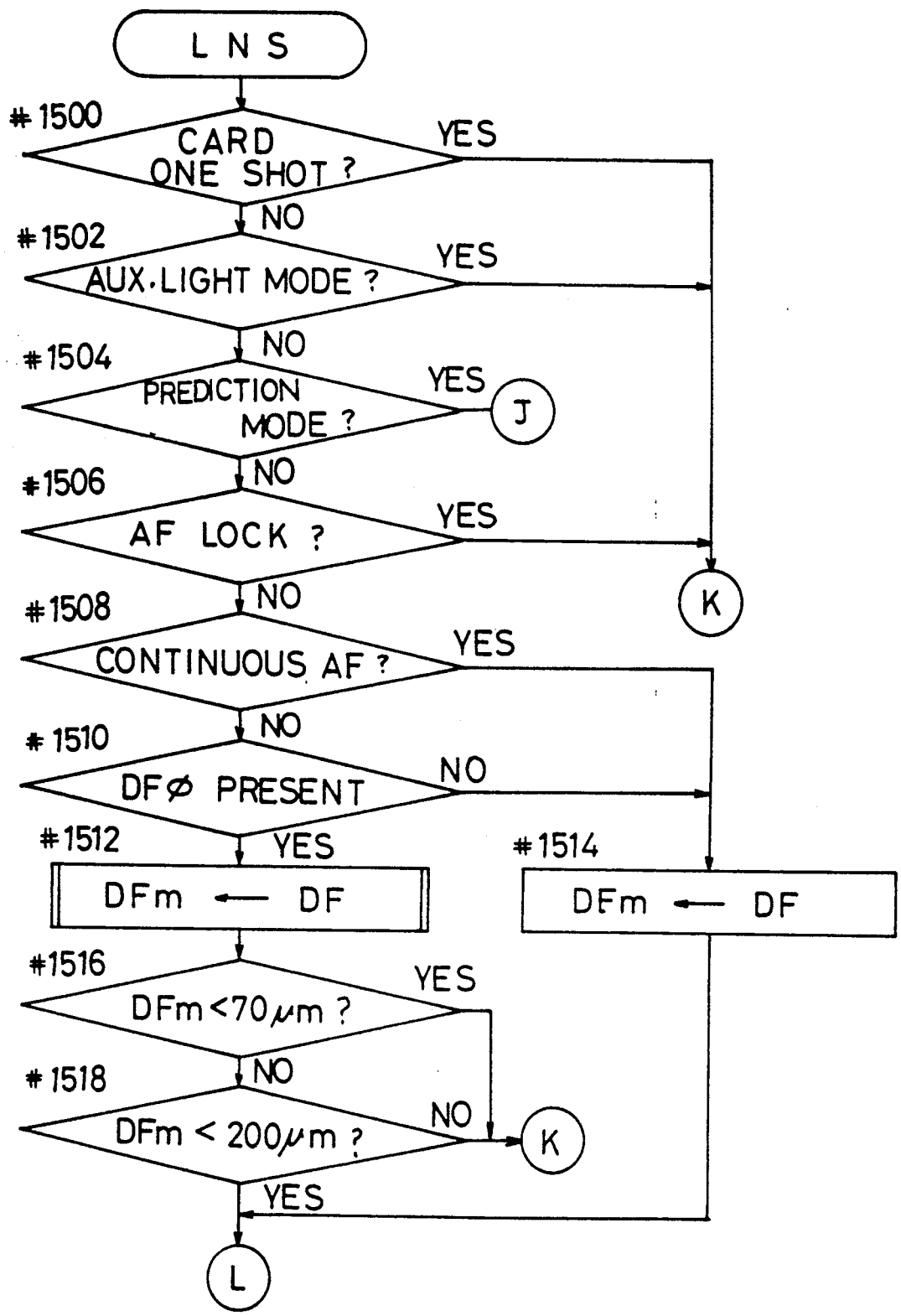
FIGS. 15a through 15c are a flow chart of a control subroutine executed for the lens drive during the mirror lift.
Figure 15B:
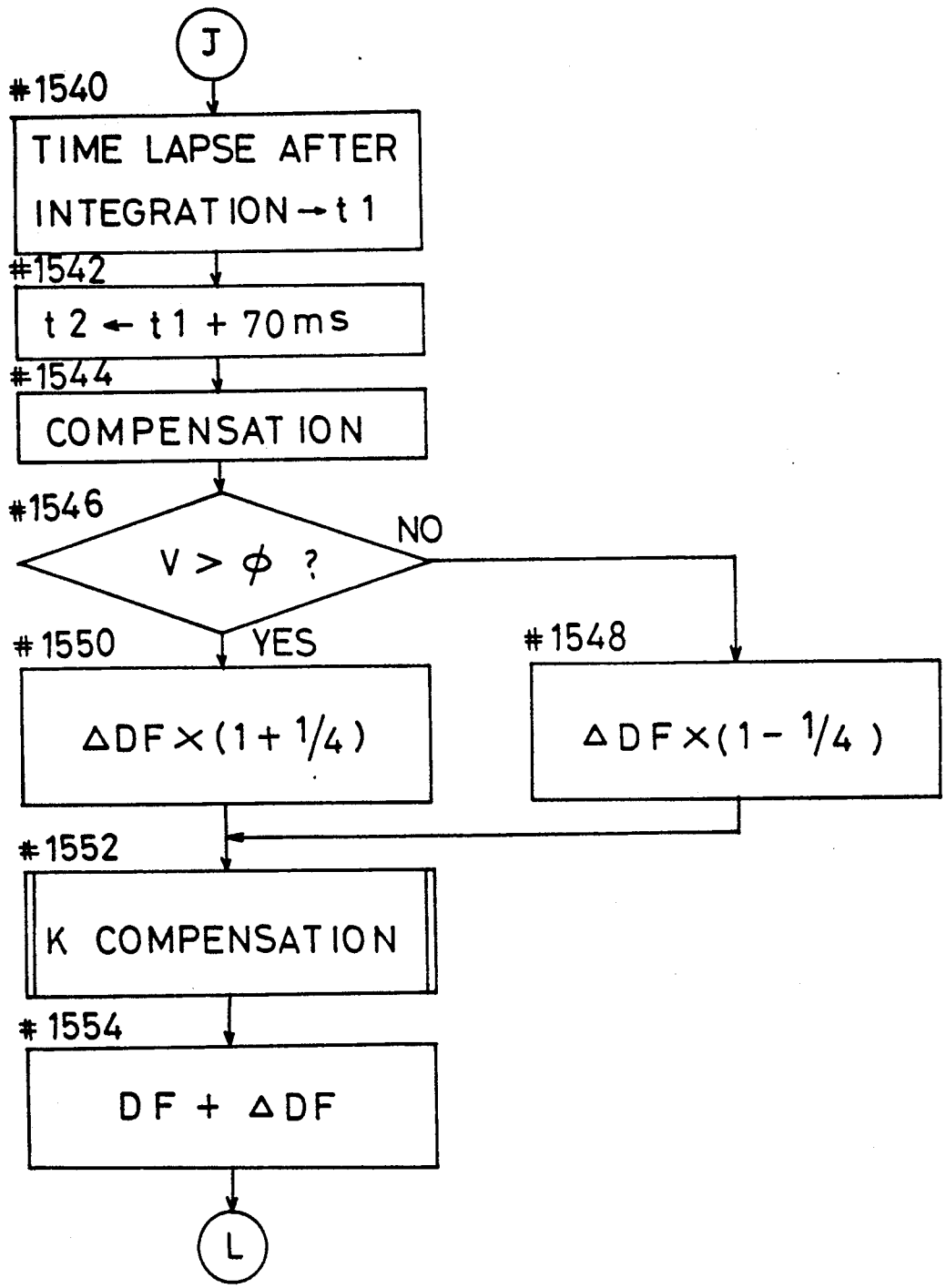
Figure 15C:
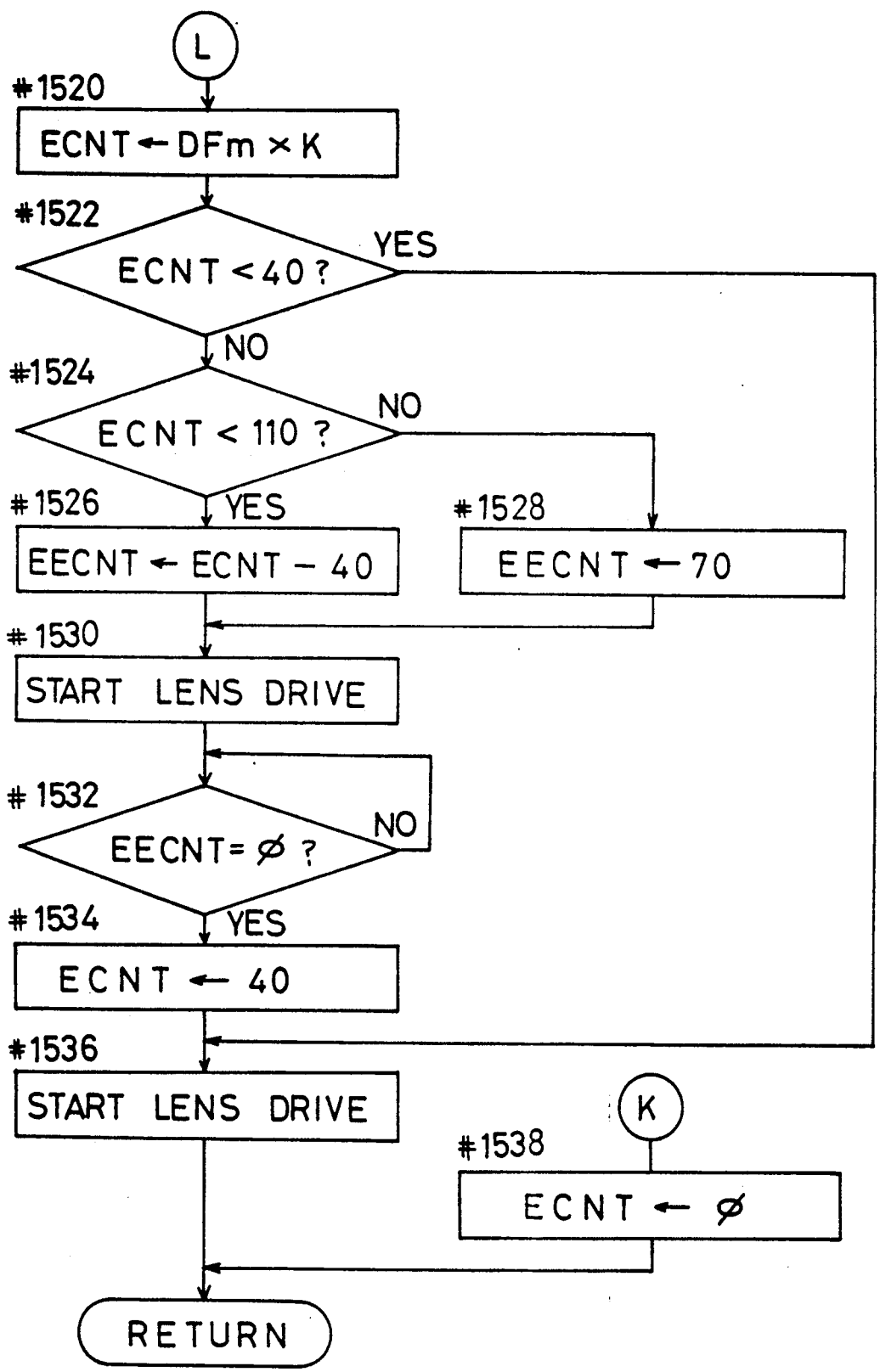

FIGS. 15a through 15c show a flow chart of the subroutine "LNS" called at step #450 for effecting the lens drive during the mirror lift.

When this subroutine is called, step #1500 first checks the card one shot flag input at step #502. If this flag is preset, the program moves to step #1538 without effecting the drive during the mirror lift. At step #1538, the drive pulse count ECNT for driving the lens is set to "0", and then the program returns to the main routine. Similarly, if step #1502 finds the auxiliary light AF mode, the program moves to step #1538 without effecting the drive during the mirror lift.

Figure 19:
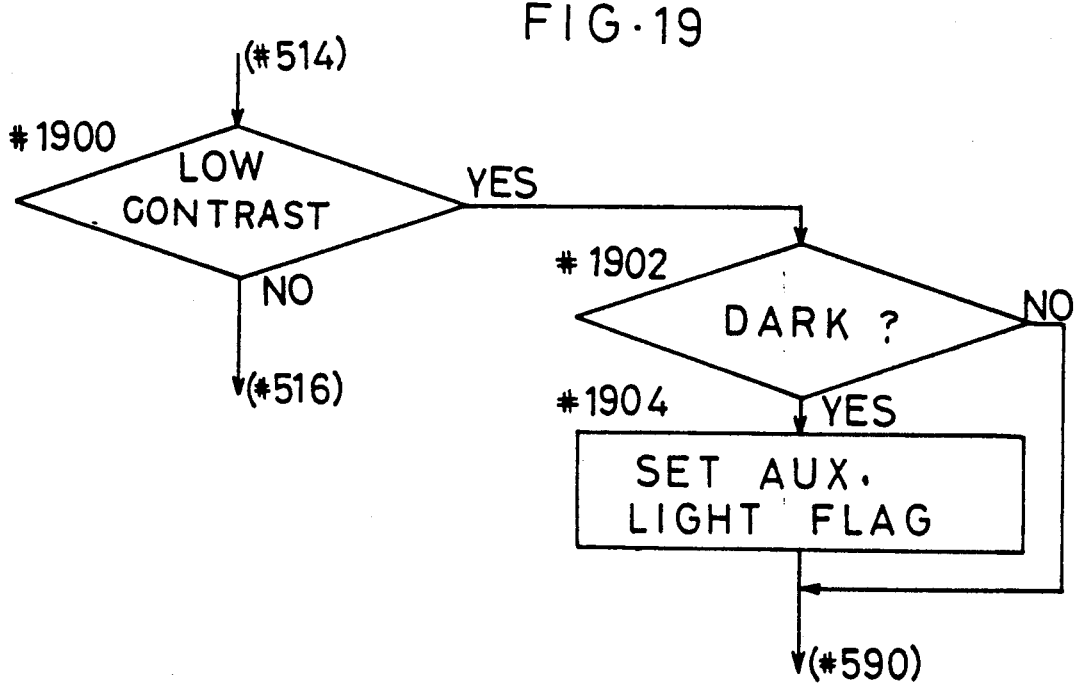
FIG. 19 is a flow chart of a subroutine executed for judging brightness of a photographic object.

The auxiliary light AF mode is switchable as shown in FIG. 19. The sequence shown in FIG. 19 is executed between steps #514 and #516 when step #514 judges that the object is out-of-focus.

First, step #1900 judges whether the object is low-contrast or not, that is, reliability of the focus detection result is checked. In the case of low-contrast, step #1902 is executed for judging if the object is dark. The object is judged dark in the event of double gain in the amplifier circuit AGC of the focus detecting circuit AFS. This corresponds to the brightness Bv being "−1". If step #1902 finds the object dark, step #1904 sets the auxiliary light flag. Then the program returns to step #590 of the main routine. If step #1902 finds the object not dark, the program returns to step #590 of the main routine without setting the auxiliary light flag. If this flag is set for a next focus detecting operation, auxiliary light is projected to the object by the auxiliary light circuit ASL when step #500 is executed for integration.

Reverting to FIG. 15a, step #1504 judges whether the prediction focusing mode is employed or not. If not, the program moves to step #1506 for checking the AF lock flag. If the AF lock is effected, the program moves to step #1538 without effecting the drive during the mirror lift as shown in Table 1.

If the AF lock is not effected, the program moves to step #1508 for judging whether the continuous AF is effected. In the case of continuous AF exiting the prediction focusing mode or continuous AF judged by the continuous AF flag transmitted from the card circuit CD, the program moves to step #1514 for setting the currently available defocus amount DF to a memory DFm for the drive during the mirror lift. This defocus amount DF is obtained through the in-focus judgment made before this sequence is started, and is not an average defocus amount.

If step #1508 judges that continuous AF has not been effected, the program moves to step #1510 for checking if the base defocus amount DFO is stored. If it is not stored, the program moves to step #1514. This occurs, for example, if both the metering switch S1 and release switch S2 are closed (which is hereinafter referred to as the release start before the in-focus condition). The base defocus amount DFO is not available since the moving body judging routine shown in FIGS. 8a through 8c is not executed. That is, in the case of release start before the in-focus condition, the defocus amount DF at the time of focus judgment is used for effecting the drive during the mirror lift. When the first average defocus amount cannot be calculated even during the moving body judging routine, the program moves from step #1510 to step #1514.

On the other hand, when an interrupt resulting from the closure of the release switch S2 occurs during the moving body judgment, the program moves to step #1512 for setting the average defocus amount DF to the memory DFm for the drive during the mirror lift. Step #1512 takes various forms depending on the photographic conditions of the camera on which importance is placed. Some examples are illustrated in FIGS. 16a through 16e.

Figure 16A:
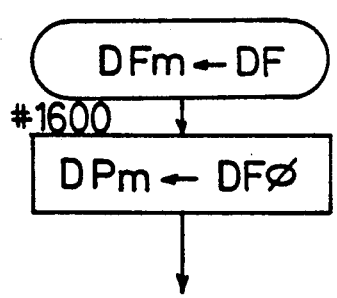
FIGS. 16a through 16e are a flow chart of a subroutine for selecting an amount of drive for the lens drive effected during the lens lift in accordance with photographic conditions.
Figure 16B:
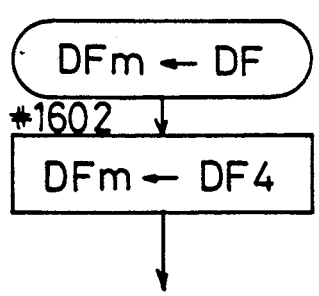

FIG. 16a shows the case where the camera is set for photographing stationary objects. The base defocus amount DFO is set to the memory DFm in this case. FIG. 16b shows the case where the camera is set for photographing moving objects. The latest average defocus amount DF4 is set to the memory DFm in this case.

Figure 16C:
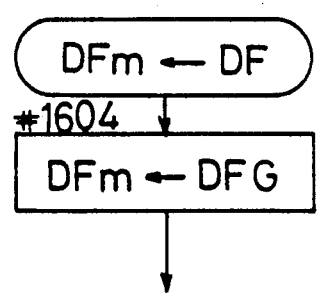
Figure 20:
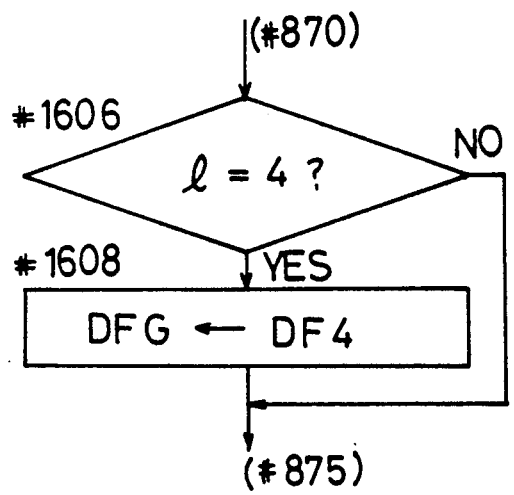
FIG. 20 is a flow chart of a subroutine executed for selecting an amount of drive for the lens drive effected during the mirror lift.

FIG. 16c shows the case where the camera is set for photographing portraits. The average defocus amount DFG obtained from the set of focus detecting operations G carried out after 0.8 second from attainment of the in-focus condition is set to the memory DFm in this case. It is necessary to set the average defocus amount DFG by executing a sequence as shown in FIG. 20 inserted between steps #870 and #875 in FIG. 8. Specifically, if the second judgment counter 1 shows "4", this means that there are four average defocus amounts DFx. It is judged that 0.8 second has just passed from attainment of the in-focus condition. Thus, the average defocus amount DF4 at this point of time is set as the average defocus amount DFG following the attainment of the in-focus condition.

Figure 16D:
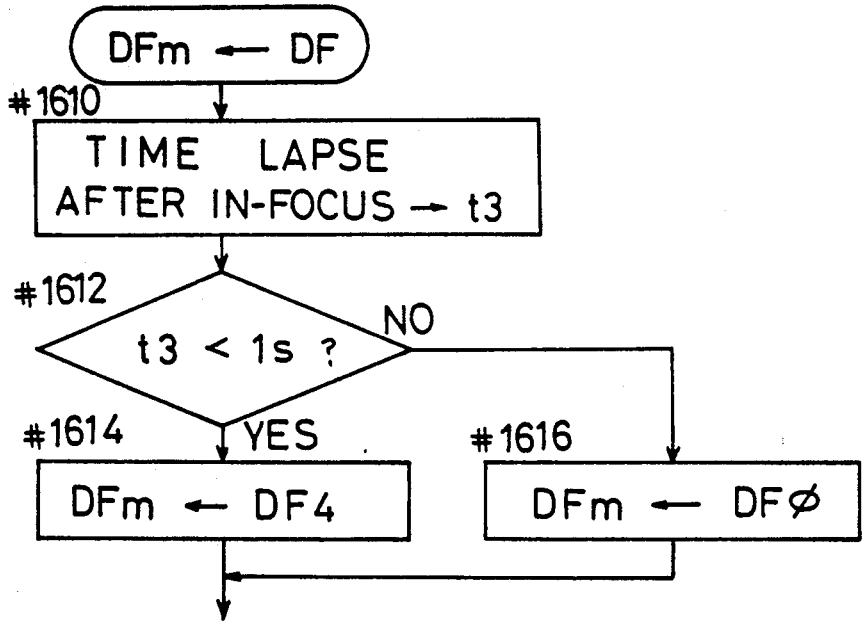

FIG. 16d shows the case where the camera is set as a utility camera or for use by beginners. Step #1610 is executed for measuring time lapse t3 from attainment of the in-focus condition till the present point of time at which the release switch S2 is closed. Then, step #1612 checks if the time t3 is less than one second. If it is, the latest average defocus amount DF4 is set to the memory DFm at step #1614 on the judgement that the camera is not deflected. Otherwise, the base defocus amount DFO is set to the memory DFm at step #1616 on the judgment that the camera has been deflected. This is done in order that the variation in the defocus amount due to a deflection of the camera relative to a stationary object is not mistaken for movement of the object.

The lens drive based on the latest average defocus amount produces a better focusing precision if the object moves so slowly that the moving body judgment does not judge the object to be moving. However, if the lens is driven by using the latest average defocus amount, a deflection of the camera relative to a stationary object will cause the AF lock judgment to fail, thereby focusing a wrong object. In order to avoid such a situation, switching is made as to the value set to the memory DFm in accordance with the time taken from attainment of the in-focus condition to the closure of release switch S2.

Figure 16E:
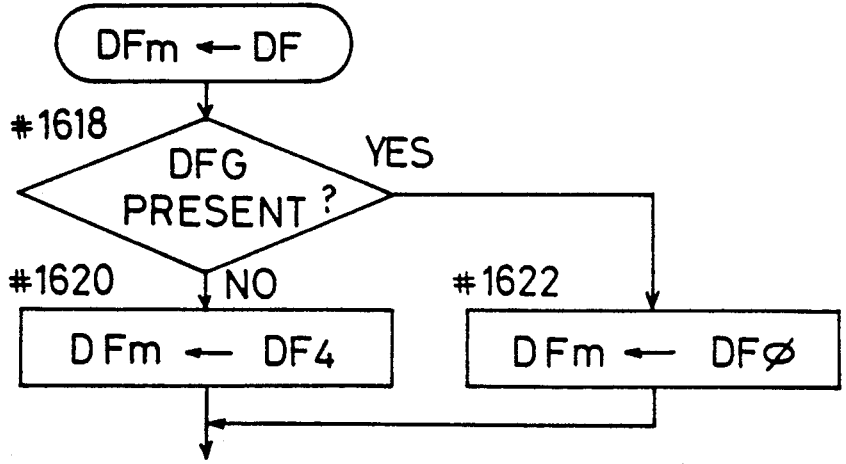

FIG. 16e shows a modification of the case shown in FIG. 16d. Here, the judgment of the time taken from attainment of the in-focus condition to the closure of release switch S2 is replaced with the judgment as to whether the average defocus amount DFG following attainment of the in-focus condition is stored or not. If the average defocus amount DFG is stored, the base defocus amount DFO is set to the memory DFm at step #1622 on the judgment that 0.8 second has passed after attainment of the in-focus condition. Otherwise, the latest average defocus amount DF4 is set to the memory DFm at step #1620 for the one-shot AF or as focus compensation for a moving object.

Although these examples are described as different embodiments, it is possible for one camera to carry out all of these operations. For this purpose, the microcomputer MC may be programmed with all these sequences which are switchable by commands from the card circuit CD or the memory circuit EEPROM.

For example, the sequence shown in FIG. 16a may be executed if "1" is written at a selected address in the memory circuit EEPROM, and the sequence shown in FIG. 16b executed if "2" is written. Similarly, the sequence shown in FIG. 16a may be executed if an IC card with "1" written at a selected address thereof is inserted into the camera, and the sequence shown in FIG. 16b executed if an IC card with "2" is inserted.

Referring to FIG. 15a again, steps #1516 and #1518 are executed after the average defocus amount is set to the memory DFm. At these steps, a zone judgment is carried out by using the lens drive amount data stored in the memory DFm, to determine whether the drive during the mirror lift is to be carried out or not. If the amount of lens drive is equal to or greater than 70 micrometers and less than 200 micrometers, the program moves to step #1520 for effecting the drive during the mirror lift.

If step #1516 judges the amount of lens drive to be less than 70 micrometers, the program returns through step #1538 to the main routine without effecting the drive during the mirror lift. That is, it is considered that the program will move to step #1516 mostly when the object is stationary. In such a case, the drive during the mirror lift is unnecessary as long as the object is inside the in-focus zone. It also serves the purpose of not impairing the "feel" during the mirror lift.

If step #1518 judges the amount of lens drive to be greater than 200 micrometers, the program, also, returns through step #1538 to the main routine without effecting the drive during the mirror lift. That is, if the object is moving fast, the program will move to step #1540 or step #1514. The program is likely to move to step #1518 only if the object is moving slowly. Since the moving speed is slow, the maximum amount of drive effected during the mirror lift may be less than 200 micrometers. It is also possible when the amount of lens drive exceeds 200 micrometers, that a deflection of the camera did not result in the AF lock.

When the program branches off to step #1514, it is totally unknown whether the object is stationary or moving. Thus, step #1520 is executed subsequently, assuming that the drive during the mirror lift is to be effected.

On the other hand, if step #1504 finds the prediction focusing mode, the program moves to step #1540 for measuring time t1 from start of the integration by the light receiving circuit CCD for the currently available defocus amount DF till the present point of time at which the release switch S2 is closed. Then, step #1542 is executed for adding the time t1 and the 70 ms mirror lifting time lag to obtain time t2. Thereafter, step #1544 is executed for multiplying the speed V of the object, which is calculated during the prediction focusing mode, by the time t2 to obtain a defocus amount $\Delta$DF resulting from the movement of the object during the time lag from integration to exposure. Since the moving body compensation is effected by using the defocus amount $\Delta$DF, this defocus amount $\Delta$DF is hereinafter referred to as the amount of moving body compensation.

Subsequently, step #1546 is executed for checking the sign of the object speed V. IF the speed V is greater than zero, it is judged that the defocus amount is increased in a focusing direction and the object is moving toward the camera.

If the object is moving toward the camera, the program moves to step #1550 for multiplying the amount of moving body compensation $\Delta$DF by one and a quarter. This is because, even if the object is moving toward the camera at a constant speed, the defocus amount on the image plane will not vary at a constant rate but will vary as the function of an inverse number. This step is taken in order to avoid a lack of compensation due to linear approximation. Thus, the figure $1+1/x$ is conceived as a compensation coefficient. Experiments have proved that, considering the likely speed of the object, the variable x is preferably in the range of 3 to 5. In view of the operating speed of the microcomputer MC, the variable x is set to "4" and the amount of moving body compensation $\Delta$DF is multiplied by $1+\frac{1}{4}$. Conversely, if the object is moving away from the camera, the program moves to step #1548 for multiplying the amount of moving body compensation $\Delta$DF by a coefficient $1-\frac{1}{4}$.

Figure 18:
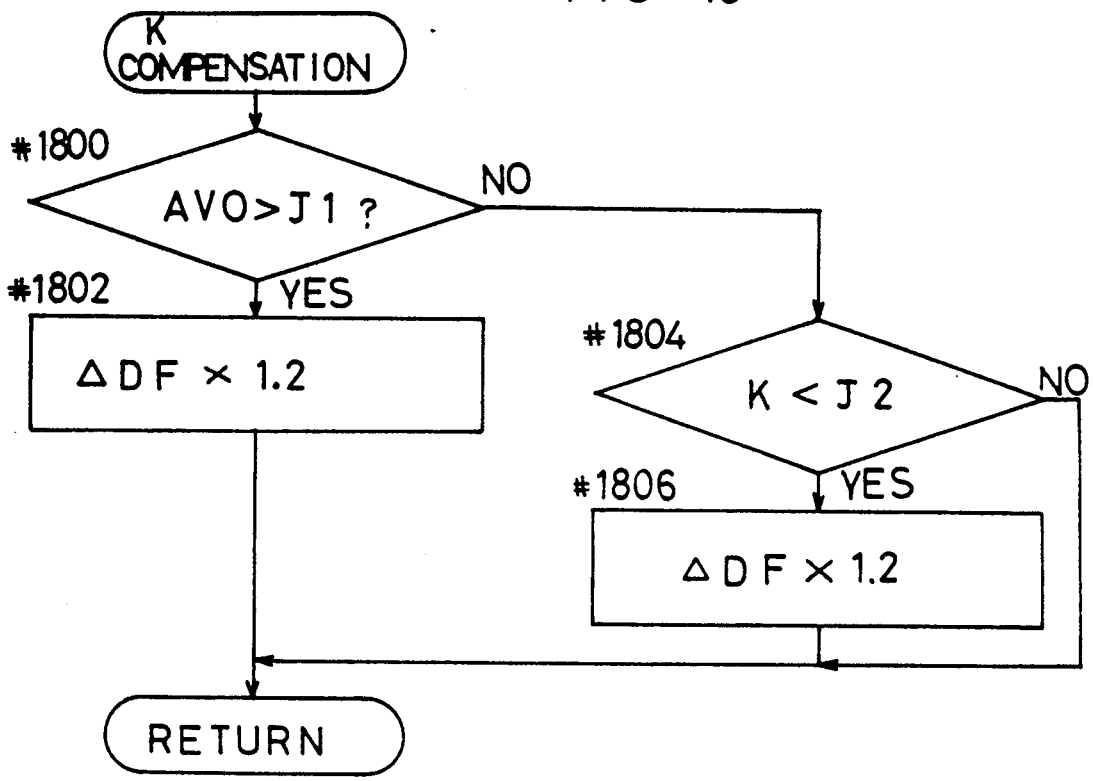
FIG. 18 is a flow chart of a subroutine executed for correcting the amount of lens drive.

Subsequently, at step #1552, the amount of moving body compensation $\Delta$DF is processed with a K value compensation. This is done taking into account an error of the conversion coefficient K for the defocus amount and the amount of lens drive. FIG. 18 shows details of this compensation. A large error of the conversion coefficient K is due to the tendency to rely on the fully open diaphragm aperture value AVo of the objective lens. Therefore, if the AVo is greater than a reference value J1, that is if the lens is dark, step #1802 is executed for multiplying the amount of moving body compensation $\Delta$DF by a coefficient 1.2. If the conversion coefficient K is small, the lens moves a large amount per count, whereby the error of the conversion has a great influence. Thus, the lack of compensation is rectified at step #1806 which multiplies the amount of moving body compensation $\Delta$DF by the coefficient 1.2.

After the K-value compensation, step #1554 is executed for adding the amount of moving body compensation $\Delta$DF to the currently available defocus amount DF for storage in the memory DFm. Then the program moves to step #1520.

At step #1520 to which the program moves from step #1524, #1518 or #1554, the amount of lens drive to be effected during the mirror lift as stored in the memory DFm is multiplied by the conversion coefficient K for setting to the drive pulse counter ECNT. Step #1522 checks whether the count of the drive pulse counter ECNT is greater than "40" which is a maximum number of pulses for driving the lens during the limited period in which the mirrors are lifted. If the count is less than "40", the program jumps to step #1536 for starting the lens drive, and then returns to the main routine.

If step #1522 finds the count to be "40" or more, the lens is driven before starting the exposure control. There is a limit to the amount of drive effected at this time. More particularly, step #1524 judges whether the count of the drive pulse counter ECNT is greater than "110" which is the sum of a maximum number of pulses "70" for lens drive before a shutter release and the maximum number of pulses "40" for the lens drive during the mirror lift. If the count is "110" or more, step #1528 sets a pre-release drive pulse counter EECNT to "70" for driving the lens before the shutter release with the maximum number of pulses "70". If step #1524 finds the count to be smaller than "110", step #1526 sets the pre-release drive pulse counter EECNT to a value obtained by subtracting "40" from the count of the drive pulse counter ECNT.

Subsequently, at step #1530, the pre-release lens drive is started, then the program waits at step #1532 until the count of the pre-release drive pulse count EECNT becomes zero. The maximum period for the pre-release lens drive is about 40 ms, which does not cause a great increase in the time lag. At step #1534, the drive pulse counter ECNT is set to "40" for effecting the remaining lens drive during the mirror lift. At step #1536, the lens drive is started, and then the program returns to the main routine.

Figure 17:
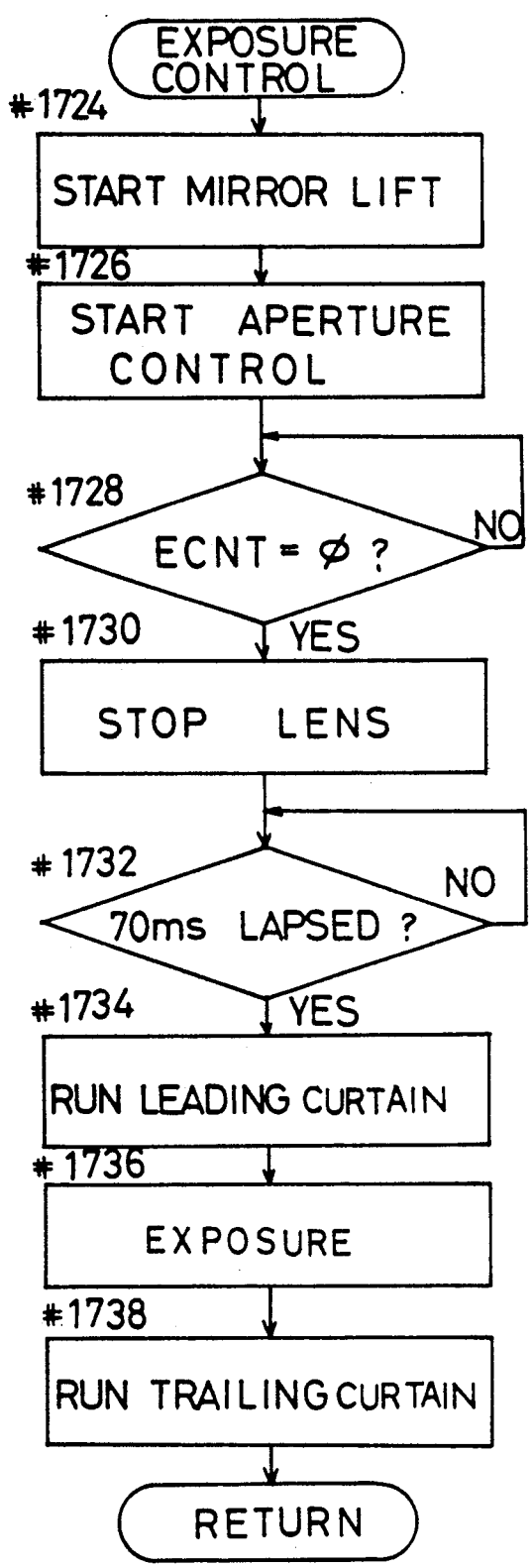
FIG. 17 is a flow chart of an exposure control subroutine.

After the program returns from the subroutine "LNS" to the main routine, the exposure control subroutine is called at step #455. FIG. 17 shows the sequence of this exposure control subroutine.

When this subroutine is called, the mirror lift is started at step #1724 and the aperture control is started at step #1726. Thereafter, the program waits at step #1728 until the count of the drive pulse counter ENCT becomes zero since the drive during the mirror lift has already started in the prediction focusing mode or the like. When the drive during the mirror lift is not effected, step #1728 is completed instantly since the counter ECNT is initially set to zero. After completely stopping the lens at step #1730, the program waits at step #1732 until 70 ms passes after the start of the mirror lift. This is because the mirror lift and aperture control are completed in 70 ms. The exposure operation is started at step #1734 upon completion of all of the mirror lift, the drive during the mirror lift and the aperture control. Step #1734 causes a run of the leading shutter curtain. At step #1736 the program stands by for the exposure period calculated at step #430 of the main routine. The exposure is completed with step #1738 for running the trailing shutter curtain. Thereafter the program returns to the main routine.

Different embodiments will be described briefly hereunder.

(1) The modification for making various judgments to find out the conditions of a photographic object and the intention of the photographer may be varied as appropriate.

(2) It is not absolutely necessary to prohibit the drive during the mirror lift when the photographic object is judged dark, when the photographic magnification is judged to be at a high rate or when the object is moving slowly away from the camera. In such cases, the prediction focusing mode allowing the drive during the mirror lift may be employed.

(3) The driving amount compensation in the drive during the mirror lift may be omitted when, for example, the object is judged to be moving fast.

(4) In the foregoing embodiment, the objective lens is detachably attached to the camera body, with lens information input from the lens circuit LEC included in the lens. The present invention is applicable to a camera including an objective lens as a component fixed to the camera body.

(5) Three focus detecting regions are provided in the foregoing embodiment. The number of such regions is variable, and may even be one.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A camera having an autofocusing mechanism, comprising:
   foucus detecting means for repeatedly detecting a focusing state of an objective lens with respect to a photographic object and outputting a focus adjustment signal;
   object detecting means for detecting movement of the object to be photographed in accordance with a plurality of said focus adjustment signals;
   image magnification detecting means for detecting an image magnification rate;
   a manually operable member;
   release means for starting a shutter release operation in response to manual operation of said operable member and carrying out a subsequent photographic operation;
   lens drive means capable of driving said objective lens during the shutter release operation when said object detecting means detects the movement of the photographic object; and
   prohibiting means for prohibiting said lens drive means from driving said objective lens when said image magnification is greater than a predetermined rate.

2. A camera as claimed in claim 1, further comprising:
   in-focus detecting means for judging whether the focusing state is an in-focus state or an out-of-focus state;
   wherein said object detecting means starts detecting the movement of the object after the in-focus state is detected, and said prohibiting means prohibits said lens drive means from driving said objective lens when the movement of the object is detected and the image magnification is greater than the predetermined rate.

3. A camera having an autofocusing mechanism, comprising:
   focus detecting means for repeatedly detecting a focusing state of an objective lens with respect to a photographic object and outputting a focus adjustment signal;
   object detecting means for detecting movement of the object to be photographed in accordance with a plurality of said focus adjustment signals;
   moving direction detecting means for detecting a direction of movement of the object based on results of detection by said object detecting means;
   a manually operable member;
   release means for starting a shutter release operation in response to manual operation of said operable member and carrying out a subsequent photographic operation;
   lens drive means capable of driving said objective lens during the shutter release operation when said object detecting means detects the movement of the photographic object; and
   prohibiting means for prohibiting said lens drive means from driving said objective lens when said moving direction detecting means detects that the object is moving away from the camera.

4. A camera as claimed in claim 3, further comprising:
   in-focus detecting means for judging whether the focusing state is an in-focus state;
   wherein said object detecting means starts detecting the movement of the object after the in-focus state is detected, and said prohibiting means prohibits said lens drive means from driving said objective lens when the movement of the object is detected and the object is moving away from the camera.

5. A camera as claimed in claim 3, wherein said prohibiting means prohibits said lens drive means from driving said objective lens when the object is moving away from the camera and a defocus amount indicated by said focus adjustment signal is greater than a predetermined value.

6. A camera having an autofocusing mechanism, comprising:
   focus detecting means for repeatedly detecting a focusing state of an objective lens with respect to a photographic object and outputting a focus adjustment signal;
   object detecting means for detecting movement of the object to be photographed in accordance with a plurality of said focus adjustment signals;
   metering means for measuring brightness of the object;
   a manually operable member;
   release means for starting a shutter release operation of response to manual operation of said operable member and carrying out a subsequent photographic operation;
   lens drive means capable of driving said objective lens during the shutter release operation when said object detecting means detects the movement of the photographic object; and
   prohibiting means for prohibiting said lens drive means from driving said objective lens when the brightness of the object is below a predetermined level.

7. A camera as claimed in claim 6, further comprising:
in-focus detecting means for judging whether the focusing state is an in-focus state;
wherein said object detecting means starts detecting the movement of the object after the in-focus state is detected, and said prohibiting means prohibits said lens drive means from driving said objective lens when the brightness of the object is below the predetermined level.

8. A camera having an autofocusing mechanism, comprising:
focus detecting means for repeatedly detecting a focusing state of an objective lens with respect to a photographic object and outputting a focus adjustment signal;
object detecting means for detecting movement of the object to be photographed in accordance with a plurality of said focus adjustment signals and outputting a movement signal;
lens drive amount determining means for determining an amount of lens drive in accordance with said movement signal;
signal generating means for generating a signal indicative of a characteristic value of said objective lens;
compensating means for producing an amount of compensation in accordance with said characteristic value, and compensating the amount of lens drive based on said amount of compensation; and
lens drive means for driving said objective lens based on the amount of lens drive as compensated.

9. A camera as claimed in claim 8, wherein said characteristic value is a conversion coefficient for converting a defocus amount into an amount of drive.

10. A camera as claimed in claim 9, wherein the amount of compensation is greater when said conversion coefficient is smaller than a predetermined value, than when said conversion coefficient is equal to or greater than the predetermined value.

11. A camera having an autofocusing mechanism, comprising:
focus detecting means for repeatedly detecting a focusing state of an objective lens with respect to a photographic object and outputting a focus adjustment signal;
object detecting means for detecting movement of the object to be photographed in accordance with a plurality of said focus adjustment signals;
lens drive means capable of driving said objective lens during the shutter release operation when said object detecting means detects movement of the photographic object;
determining means for determining whether or not said lens drive means is to be driven during the shutter release operation, said determining means having a plurality of determination methods selectively operable and carrying out the determination operation based on one of the determination methods;
input means for inputting a signal from an external storage; and
selecting means operable in response to the signal inputted by said input means for designating one of the determination methods corresponding to the inputted signal.

12. A camera as claimed in claim 11, wherein said said external storage is an IC card.

* * * * *